US012584838B2

(12) United States Patent
Clark et al.

(10) Patent No.: US 12,584,838 B2
(45) Date of Patent: Mar. 24, 2026

(54) METHOD FOR DENSITY MEASUREMENT OF MATERIALS USING COMPUTED TOMOGRAPHY WITH DIFFRACTION ARTIFACT CORRECTION

(71) Applicant: DigiM Solution LLC, Woburn, MA (US)

(72) Inventors: Andrew Garrison Clark, Cambridge, MA (US); Jeffrey Michael Wong, Chelmsford, MA (US); Aijun Zhu, Winchester, MA (US); Shuang Zhang, Winchester, MA (US)

(73) Assignee: DIGIM SOLUTION LLC, Woburn, MA (US)

( * ) Notice: Subject to any disclaimer, the term of this patent is extended or adjusted under 35 U.S.C. 154(b) by 350 days.

(21) Appl. No.: 18/345,197

(22) Filed: Jun. 30, 2023

(65) Prior Publication Data

US 2024/0003797 A1 Jan. 4, 2024

Related U.S. Application Data

(60) Provisional application No. 63/367,532, filed on Jul. 1, 2022.

(51) Int. Cl.
*G01N 9/24* (2006.01)
*G01N 23/046* (2018.01)

(52) U.S. Cl.
CPC ............. *G01N 9/24* (2013.01); *G01N 23/046* (2013.01); *G01N 2223/303* (2013.01); *G01N 2223/419* (2013.01)

(58) Field of Classification Search
CPC .. G01N 23/046; G01N 9/24; G01N 2223/419; G01N 15/0211;
(Continued)

(56) References Cited

U.S. PATENT DOCUMENTS 8,290,564 B2 10/2012 Lang et al.
11,081,212 B2 8/2021 Zhang
(Continued)

FOREIGN PATENT DOCUMENTS

WO 2024/006990 A1 1/2024

OTHER PUBLICATIONS

Bevington,P. et al., "Data reduction and error analysis for the physical sciences", Third Edition, Mcgraw-Hill Higher Education, 2003, 338 pages.
(Continued)

*Primary Examiner* — Irakli Kiknadze
(74) *Attorney, Agent, or Firm* — Hamilton, Brook, Smith & Reynolds, P.C.

(57) ABSTRACT

Embodiments determine the density of materials and objects imaged using computed tomography (CT). An embodiment co-images a material of unknown density with a calibrant of known density. The digitally reconstructed CT images are segmented into the unknown material phase and the known material phases of the calibrant. Image intensity histograms of the unknown material are obtained. Using the known calibrant densities, an intensity-density mapping is calculated to determine the unknown material density based on its measured CT intensity. The method described herein utilizes a novel deconvolution of the intensity histograms to correct for CT imaging artifacts that impact the material phase intensities. The density of micronized materials and features such as particles, microspheres, porosity, and multiphase composites which are difficult to measure with conventional techniques can be measured using the embodiments. The design of custom sample holders for co-imaging a material with the calibrant and uncertainty estimation are also described.

12 Claims, 18 Drawing Sheets

(58) Field of Classification Search

CPC ... G01N 2015/0238; G01N 2015/0038; G01N 33/2823; G01N 9/00; G01N 27/026; G01N 27/04; G01N 27/622; G01N 33/00; G01N 2001/2893; G01N 33/0006; G01N 23/203; G01N 2223/1013; G01N 2223/639; G01N 2223/601; G01N 9/36; G01N 23/16; G01N 23/083; G01N 2223/613; G01N 33/46; G01N 2223/633; G01N 2223/303; G05D 7/0617; H01J 49/0009; H01J 49/062; H01J 49/0036; H01J 49/025; G01F 1/74

USPC .......................... 378/4, 20, 68, 207, 208, 19

See application file for complete search history.

(56) References Cited

U.S. PATENT DOCUMENTS

| | | | |
|---|---|---|---|
| 2013/0028371 A1 | 1/2013 | Derzhi | |
| 2013/0202078 A1 | 8/2013 | Lee | |
| 2014/0044315 A1* | 2/2014 | Derzhi | G06T 15/08 |
| | | | 382/109 |
| 2016/0134852 A1* | 5/2016 | Gao | H04N 9/3185 |
| | | | 348/745 |
| 2018/0008220 A1 | 1/2018 | Boone et al. | |
| 2018/0082447 A1 | 3/2018 | Recur et al. | |
| 2018/0271465 A1* | 9/2018 | Proksa | G16H 50/30 |
| 2021/0315515 A1* | 10/2021 | Benson | A61B 5/742 |
| 2023/0027514 A1* | 1/2023 | Ma | G06T 7/181 |

OTHER PUBLICATIONS

Fredenberg, S., et al., "The mechanisms of drug release in poly(lactic-co-glycolic acid)-based drug delivery systems—A review", International Journal of Pharmaceutics, vol. 415, No. 1-2, Aug. 30, 2011, pp. 34-52.

Fukada, E., et al., "Piezoelectric Effect in Polarized Poly (vinylidene Fluoride)", Japan. J. Appl. Phys., vol. 8, 1969, 2 pages.

Huda, W., et al., "Review of Radiologic", Second edition, Lippincott Williams &Wilkins, 2003, 6 pages.

Kalasova, D., et al., "Characterization of a Laboratory-Based X-Ray Computed Nanotomography System for Propagation-Based Method of Phase Contrast Imaging", IEEE Transactions on Instrumentation and Measurement, vol. 69, No. 4, Apr. 2020, 10 pages.

Landolt-Bornstein, Numerical Data and Functional Relationships in Science and Technology, vol. 6, Group VIII, Polymers Part 1, Definitions and Physical Properties I, 2013, 1140 pages.

Lovinger, A. J., "Ferroelectric Polymers", Science, vol. 220, No. 4602, Jun. 10, 1983, pp. 1115-1121.

Mayer-Chen, H. H., et al., "Standardizing CT lung density measure across scanner manufacturers", Medical Physics, Jan. 6, 2017, 12 pages.

Oster, G., et al., "Density Gradient Techniques.", Chem. Rev., vol. 63, No. 3, Jun. 1, 1963, pp. 257-268.

Richards, S., et al., "Determination of particle density using water and gas pycnometry", Geotechnique, vol. 57, No. 4, 2007, pp. 403-406.

Swinehart, D. F., "The Beer-Lambert Law", j. Chem. Educ., Jul. 1962, pp. 333-335.

Yost, E., et al., "Quantitative X-Ray Microcomputed Tomography Assessment of Internal Tablet Defects", Journal of Pharmaceutical Sciences, vol. 108, 2019, pp. 1818-1830.

Zhang, S., et al., "Characterization of Controlled Release Microspheres Using FIB-SEM and Image-Based Release Prediction", AAPS Pharm. Sci. Tech., vol. 21, Jul. 14, 2020, 14 pages.

Zhong, H., et al., "A Comprehensive Map of FDA-Approved Pharmaceutical Products", Pharmaceutics, vol. 10, No. 4, 2018, pp. 1-19.

Holt, J., et al., "Correction of beam hardening artefacts in microtomography for samples imaged in containers", Proceedings Of Spie, vol. 9212, Sep. 11, 2014, pp. 92120A-92120A.

International Search Report and Written Opinion received for PCT Patent Application No. PCT/US23/69498, mailed on Dec. 15, 2023, 18 pages.

* cited by examiner

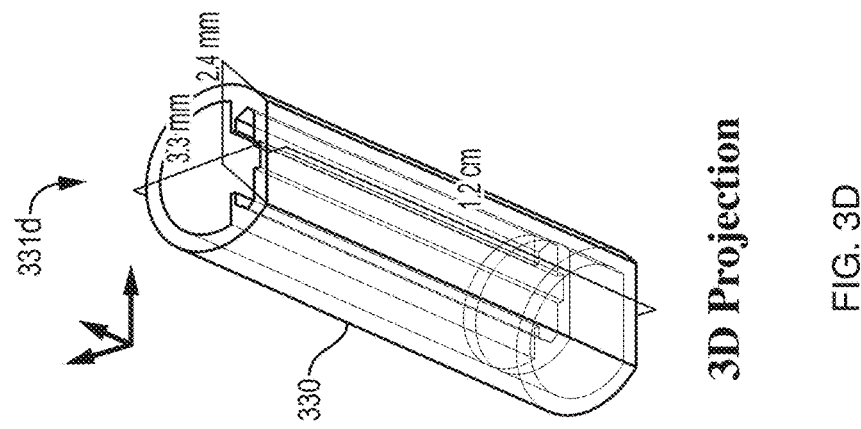
3D Projection
FIG. 3D
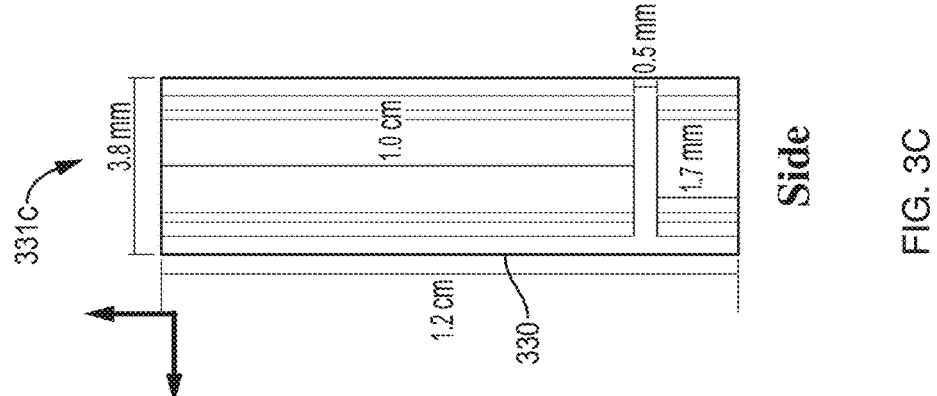
Side
FIG. 3C
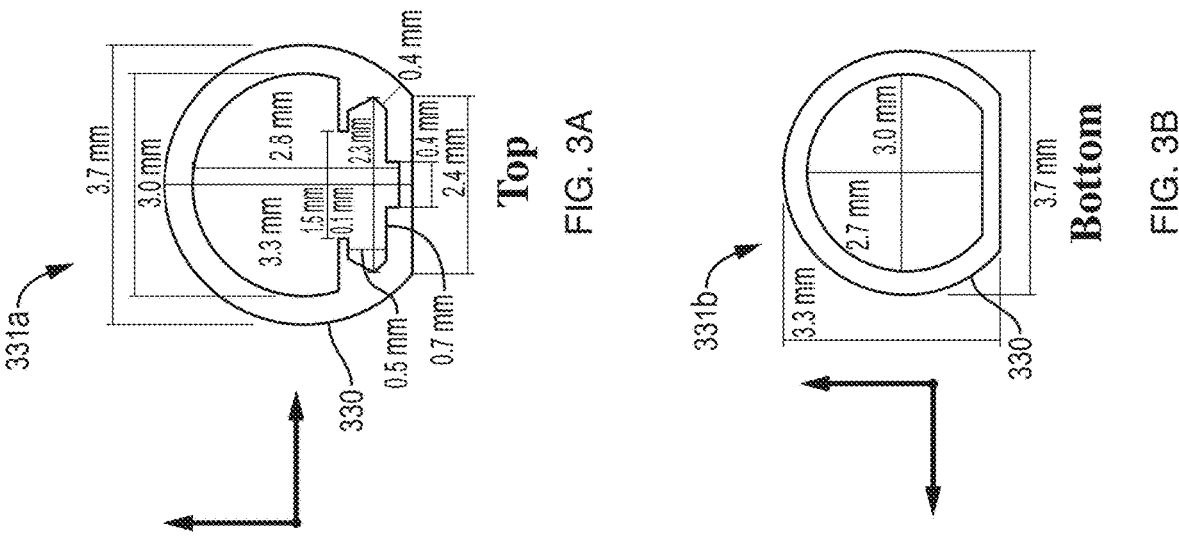
Top
FIG. 3A
Bottom
FIG. 3B

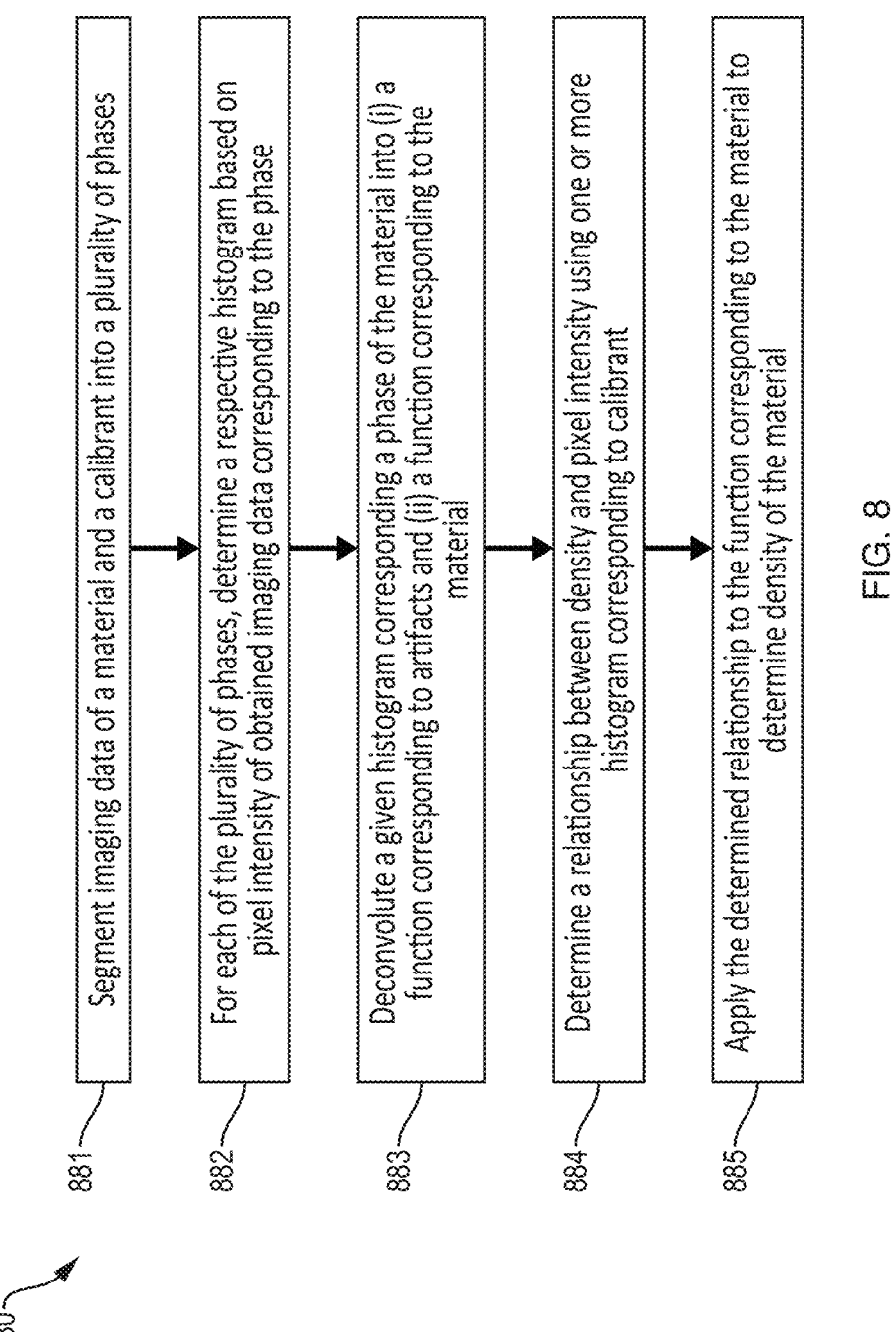

Segment imaging data of a material and a calibrant into a plurality of phases

For each of the plurality of phases, determine a respective histogram based on pixel intensity of obtained imaging data corresponding to the phase Deconvolute a given histogram corresponding a phase of the material into (i) a function corresponding to artifacts and (ii) a function corresponding to the material Determine a relationship between density and pixel intensity using one or more histogram corresponding to calibrant Apply the determined relationship to the function corresponding to the material to determine density of the material

METHOD FOR DENSITY MEASUREMENT OF MATERIALS USING COMPUTED TOMOGRAPHY WITH DIFFRACTION ARTIFACT CORRECTION

RELATED APPLICATION

This application claims the benefit of U.S. Provisional Application No. 63/367,532, filed on Jul. 1, 2022. The entire teachings of the above application are incorporated herein by reference.

BACKGROUND

The density of a material, defined as the amount of mass within a unit volume, is a fundamental property of the material. For homogenous materials such as metals, the density is directly related to the underlying crystal structure of the material and is a useful parameter in identifications of different metallic materials. Similarly, for homogeneous polymeric materials, the density can be used to determine the relative amorphous and crystalline fraction as well as to identify the presence of specific crystal polymorphs. The bulk mechanical, thermal, and electric properties can be dependent on the underlying crystal fraction and crystal phase for many materials. As such, density is a fundamental metric for the classification, comparison, performance evaluation, and quality assessment of materials. As an example, the polymer poly(vinylidene fluoride) (PVDF) has five known crystal polymorphs with the β-phase displaying piezoelectric, pyroelectric, and thermoelectric behavior (Steiner and Zimmerer [12]; Lovinger [9]; Kawai [7]) (bracketed numbers in this document refer to the enumerated list of references hereinbelow). The unique chain conformation and crystal structure of the β-phase results in a significantly higher density of β-phase PVDF when compared to the more common α-phase crystals and amorphous PVDF (Steiner and Zimmerer [12]; Lovinger [9]). Thus, density can be a critical measurement in determination of PVDF crystal phase and, thus, a performance indicator for potential electroactive products. Density measurements are considered mandatory by the scientific community when characterizing a material product, and, likewise, density measurements are considered mandatory by regulatory agencies when a product and its composing raw material requires regulation such as in the example of pharmaceuticals.

In the case of a heterogenous product composed of multiple different materials, the density is a linear combination of the different phases and can be used to deduce the relative fraction of the different component phases. In the development of pharmaceutical products, active pharmaceutical ingredients (APIs) are routinely blended with a wide array of excipient materials. The excipients can aid in API manufacturability and modulate the release of the API from the drug product. In the case of long-acting injectable, parenteral products, and drug eluding implants or devices, the encapsulation of the API within a polymer excipient is central to the function of the product, while for oral solid dosage forms, the excipients make tableting of the drug product for human consumption possible (Fredenberg et al. [4]; Zhong et al. [17]; Yost et al. [14]). Assessing the density of these products not only enhances the understanding of encapsulation efficiency and mixing, but also provides a means of evaluating microstructure features (such as porosity) of the product which has been shown to greatly impact product performance (Zhang et al. [15]). From an upstream processing standpoint, measuring the density of the API and excipients at various manufacturing timepoints (e.g., pre-granulation, post-granulation, pre-extrusion, post-extrusion) is a powerful tool in product quality control. Changes in density before and after these steps can signify a change in either chemical states between crystalline and amorphous, or structural states between dispersion and aggregation. The potential introduction and evolution of porosity can have substantial implications in dissolution performance, release rate, and drug product stability.

Measurement of the density of a material is typically achieved using one of several techniques. The most straightforward method is to measure the mass and volume of the material in question and calculate the density directly. This method is useful in its simplicity. However, complications arise for objects of non-uniform shape which leads to difficulties in measuring volume, or for objects that are too small to be weighed using conventional means, such as microspheres or extremely limited amounts of API substance in early development stages. Other techniques for density measurement include density gradient columns as well as gas pycnometry, which can be used with materials that have non-uniform shapes. Gradient columns are advantageous as they allow for direct measurement of the density of an object. However, gradient columns are limited in range by the choice of gradient liquids used in the column (Oster and Yamamoto [10]). Furthermore, the utility of gradient columns is limited because the amount of material under test must be large enough to be directly visualized within the gradient column. Gas pycnometry measures the density of a material by determining the volume of gas displaced by the test material in a testing cell of known volume (Richards and Bouazza [11]). While pycnometry can be used to determine the density of non-uniform solids as well as the density of porous materials, pycnometry is not a technique designed to measure density directly. Rather pycnometry measures the volume of the test material and requires that the mass of the test material be known which precludes density determination of objects too small to be effectively weighed. To date, there are no techniques that can reliably and accurately measure the density of materials with microscopic features such as powders, composite particles (e.g., drug encapsulated polymeric microspheres), samples with micro-porosity, or samples in very small amounts. Frequently for these materials, density is reported as either the "bulk density" or "tapped density." Bulk density is the density of a particulate or powder sample as loaded into a container of known volume, and tapped density is the density after the powder has been mechanically tapped to promote settling of the powder. Both of these measurements are an estimate that does not capture the "true density" of the material. In the case of pharmaceutical drug product development, bulk density measurements offer little insight into variations in the solid-state phase of these products at various stages. This is because bulk density measurement is more of a measure of particle packing efficiency that is dependent on the shape, size, and brittleness of the particles, and the compaction method. Furthermore, bulk density offers little to no understanding of the phase distribution in heterogeneous drug products, especially if the underlying density of a phase is unknown. For parenteral microspheres, granulated products, and raw powder materials, true density measurements are difficult or impossible to perform via the conventional methods due to the microscopic features of the samples. As such, the development of a different measurement technique is needed.

Computed Tomography (CT) imaging is an imaging modality that is sensitive to the true density of an imaged object due to the source signal transmitting through the entire object. In X-ray imaging for example, X-ray photons pass through an object and are recorded at a detector which measures the total X-ray count (Huda and Slone [5]). When the X-ray photons pass through the material, the X-ray photons interact with electron clouds of the underlying atoms in the material. Electrons excited by the X-rays will re-emit X-ray photons, which can then travel through the material and land at the detector. The intensity of X-ray-electron interaction within a material is determined by the energy of the incoming X-ray photons, the electron and atomic structure and form factors, and the atomic number of the underlying atom. The measured X-ray signal intensity therefore depends on the specific elemental composition of the material as well as how many absorbing atoms are in the photons' path. If the elemental composition is identical between two samples, then variations in the X-ray signal intensity arise primarily from variations in the density of the two samples. Although the interaction between the source signal and the atomic structure of the material object may be different, intensity captured by other tomographic techniques such as optical tomography, electron tomography, and magnetic tomography shares similar dependency on the true density of the materials composing the object.

Calibrating the measured CT imaging intensity using known standards can allow for determination of an object's density. This forms the basis for clinical X-ray imaging and medical CT in determining bone injuries, the advancement of osteoporosis, and degenerative lung disease (Chen-Mayer et al. [3]; Boone and Yellen-Nelson [2]; Lang et al. [8]). For objects with microscopic features and powder samples, MicroCT and X-ray microscopy (XRM) is required in order to capture the interactions between the X-ray photons and the material with sufficient resolution. MicroCT and XRM operate under the same physical principle as medical CT, with the major difference being several orders of magnitude increase in imaging resolution from 0.5-50 mm/voxel in clinical CT to 0.5-50 μm/voxel in micro-CT and XRM. These higher resolution X-ray imaging methods provide a potential route for determination of true density of a material with microscopic features. Determination of density using MicroCT and XRM can offer a robust understanding of a material's properties as well as offer a powerful quality control metric.

Several challenges unique to MicroCT and XRM have so far prevented its use as a tool for true density measurement. The first challenge is the identification and construction of appropriate density standards. The density standards must be composed of elements that are of comparable atomic mass to the material of interest. The density range of the standard materials should cover the density of the material of interest, to allow interpolation. The density difference of the standard material, on the other hand, should be spaced to support the precision of interpolation. Due to the variability in CT instrumentation, the lack of run-to-run consistency, and the relatively small field of view when imaging at very high resolution, the density standards must be small enough to be co-imaged with the material of interest without obstructing the field of view. The second challenge is in mitigating and correcting for X-ray imaging artifacts that can substantially impact the overall measured intensity of a sample. Such imaging artifacts become significant when the features of interest are small enough that optical effects such as Fresnel diffraction and X-ray beam hardening impact a significant fraction of imaged voxels. These challenges have so far hindered development of an X-ray based method for determining the true density of materials with microscopic features.

SUMMARY

Embodiments solve the foregoing problems and provide functionality to determine the density of materials. One such embodiment is directed to a computer-implemented method for determining density of a material. The method begins by segmenting imaging data of a material and a standard material (referred to interchangeably herein as a "calibrant") into a plurality of phases, e.g., intensity phases. For each of the plurality of phases, a respective histogram is determined based on pixel intensity of obtained imaging data corresponding to the phase. In turn, a given histogram corresponding to a phase of the material is deconvoluted into (i) a function corresponding to artifacts, e.g., intensity of the artifacts and (ii) a function corresponding to the material, e.g., intensity of the material. To continue, a relationship between density and pixel intensity is determined using one or more histogram corresponding to the calibrant. This determined relationship is applied to the function corresponding to the material, e.g., the function corresponding to the intensity of the material, to determine density of the material.

An embodiment obtains the imaging data of the material and the calibrant by subjecting the material and the calibrant, in a sample holder, to a CT imaging.

According to an embodiment, segmenting the imaging data comprises at least one of: (i) segmenting the imaging data based on intensity, (ii) segmenting the imaging data based upon gradients, and (iii) segmenting the imaging data by processing the imaging data with at least one of a machine learning algorithm or artificial intelligence algorithm to identify data corresponding to each phase of the plurality of phases.

In an example embodiment, deconvoluting the given histogram corresponding to a phase of the material includes performing an analysis, e.g., a regression analysis, to deconvolute, i.e., fit, data of the given histogram to (i) the function corresponding to artifacts and (ii) the function corresponding to the material. Further, it is noted that embodiments are not limited to deconvoluting a single histogram to a single function corresponding to artifacts and a single function corresponding to the material and, instead, multiple histograms resulting from the imaging data can be deconvoluted to multiple functions corresponding to multiple different artifacts and multiple functions corresponding to multiple materials, e.g., material phases of a sample for which density is being determined. For example, an embodiment may deconvolute the given histogram into (i) multiple functions corresponding to multiple different artifacts and (ii) multiple functions corresponding to multiple materials.

The calibrant may include a plurality of calibrant-materials (i.e., standard materials) each with a respective known density. In one such embodiment, determining the relationship between density and pixel intensity using one or more histogram corresponding to the calibrant includes determining average pixel intensity for each of the plurality of calibrant-materials using respective histograms corresponding to each of the plurality of calibrant-materials. In turn, the relationship is determined using the average pixel intensity determined for each of the plurality of calibrant-materials and respective known densities of each of the plurality of calibrant-materials. According to an embodiment, determining average pixel intensity for each of the plurality of calibrant-materials using respective histograms corresponding to each of the plurality of calibrant-materials comprises deconvoluting each histogram corresponding to each of the plurality of calibrant-materials into (i) an artifact function and (ii) a calibrant-material function. The average pixel intensity of each of the plurality of calibrant-materials is then determined using corresponding calibrant-material functions. According to an embodiment, the determined relationship is a mathematical function, e.g., a linear function, between the average pixel intensity determined for each of the plurality of calibrant-materials and the respective known densities of each of the plurality of calibrant-materials.

Embodiments may also perform various additional functionalities (alone or together). For instance, an embodiment determines average density of the material. Embodiments can also determine uncertainty in the determined density. Further still, responsive to the material being composed of discrete particles, an embodiment determines a density distribution of the particles over a range of particle sizes, a density of each particle, and a standard deviation of each particle. Responsive to the material being composed of continuous material phase, an example embodiment determines a density distribution along arbitrary orientations in at least one of: a Cartesian coordinate system, a cylindrical coordinate system, and a spherical coordinate system. Further, it is noted that in an embodiment, the foregoing functionality may be implemented as part of determining the density of the material.

Embodiments may also be configured to implement a systematic iterative refinement where an unphysical density measurement caused by diffraction heterogeneity is experienced. For instance, an embodiment may identify that the determined density is unphysical and, in response to identifying the determined density is unphysical, determine corrected density (e.g., through an iterative refinement) or determine corrected density cannot be identified.

According to an embodiment, determining corrected density comprises at least one of: (i) generating corrected imaging data by processing the imaging data using a feature size threshold to remove resolution artifacts and repeating the segmenting, determining a respective histogram, deconvoluting, determining a relationship, and applying using the corrected imaging data; (ii) obtaining new imaging data of the material and a new calibrant and repeating the segmenting, determining a respective histogram, deconvoluting, determining a relationship, and applying using the new imaging data; and (iii) obtaining higher resolution imaging data that corrects for at least one of geometry, shape, and morphology caused heterogeneity, and repeating the segmenting, determining a respective histogram, deconvoluting, determining a relationship, and applying using the higher resolution imaging data.

In an embodiment, the iterative refinement may include: (i) correcting resolution artifacts by a feature size threshold in a unit of number of pixels, to exclude small particle features that are not fully resolved to give accurate density measurements, thus convoluting total density measurements; (ii) introducing a new calibrant with inclusion of atomic elements from third or higher rows of the periodic table, while the new calibrant material choice is determined based on either unphysical measurement or known atomic composition of material of interest, followed by repeating the workflow (i.e., repeating the segmenting, determining a respective histogram, deconvoluting, determining a relationship, and applying); and (iii) a correction on geometry, shape, and morphology caused diffraction heterogeneity which often requires higher resolution scans. While embodiments may be configured to implement a systematic iterative refinement, embodiments may also be configured to determine the methods described herein for determining density are not applicable when diffraction heterogeneity is too strong. Further, an embodiment may include functionality to determine that the output value, i.e., density, is not physically correct, and such an embodiment may include functionality to suggest how to obtain physically accurate results. For example, in a microsphere sample composed of two materials with known density, the true density of the microsphere sample should be between the known densities of the two materials. If the true density measurement is higher than the high density of the two materials, or lower than the low density of the two materials, then the measurement is unphysical. The inclusion of unexpected material, diffraction artifacts that are not currently considered, and density range of current calibrants can be the root causes that require iterative determination described herein.

Another embodiment is directed to a system that includes a processor and a memory with computer code instructions stored thereon. In such an embodiment, the processor and the memory, with the computer code instructions, are configured to cause the system to implement any embodiments or combination of embodiments described herein.

Yet another embodiment is directed to a computer program product for determining density of a material. The computer program product comprises one or more non-transitory computer-readable storage devices and program instructions stored on at least one of the one or more storage devices. The program instructions, when loaded and executed by a processor, cause an apparatus associated with the processor to perform any embodiments or combination of embodiments described herein.

An example embodiment is directed to a system for positioning a material. The system, according to an embodiment, includes a material, a calibrant, and a holder. The holder defines (i) a material-chamber configured to house the material, (ii) a calibrant-chamber configured to house the calibrant, and (iii) a channel, e.g., an air channel, separating the material-chamber and the calibrant-chamber.

In an embodiment of the material positioning system, the calibrant comprises one or more of: a plurality of thin film layers, a plurality of sample holder materials, and a plurality of particles. In one such embodiment, the plurality of thin film layers includes a first polymer thin film layer, a second polymer thin film layer, and a third polymer thin film layer, wherein the first polymer thin film layer and third polymer thin film layer sandwich the second polymer thin film layer. According to an example embodiment, the second polymer thin film layer includes a first polymer thin film strip and a second polymer thin film strip separated by a channel, e.g., an air channel. In embodiments the plurality of polymer thin film layers may be disposed on top of an adhesive layer. Further, in an embodiment, each thin film layer is composed of at least one of: poly(propylene) (PP) having a density of 0.91 g/cm$^3$, poly(ethylene terephthalate) (PET) having a density of 1.38 g/cm$^3$, and poly(tetrafluoroethylene) (PTFE) having a density of 2.2 g/cm$^3$.

According to an embodiment, the holder is configured to consistently position and orient the calibrant. In this way, such an embodiment facilitates imaging attenuation of the material to uniformly impact the calibrant. This can improve density measurements, e.g., in an embodiment improving the determination of bone density, amongst other examples. Further, in an embodiment of the system, the calibrant is loaded into the holder in a consistent manner so that when the holder (housing the material and calibrant) is subjected to imaging, X-ray attenuation of the material is impacted by the calibrant uniformly. For example, if a strip-shaped calibrant is positioned vertically with regard to an x-ray beam, the calibrant is positioned vertically on samples to be compared, i.e., the calibrant is positioned/oriented in a same manner (consistently) across different samples being compared. To further illustrate, returning to the example where the calibrant is positioned vertically, the calibrant is not positioned horizontally with regard to the x-ray beam in another sample being compared.

Another embodiment of the system further includes an imaging instrument. In an embodiment, parameters of the imaging instrument are calibrated using the calibrant and a calibration material of interest. The calibration material of interest has a known density which is different from density of the calibrant. In this way, in such an embodiment, the density measurement obtained using the imaging instrument, material, calibrant, and holder is independent from a vendor, magnification (e.g., local tomography magnification, geometrical magnification, etc.), parameters (e.g., exposure time), and imaging contrast (e.g., adsorption contrast, phase contrast, etc.).

According to an embodiment, a holder can be any appropriate geometry that facilitates co-imaging the material, i.e., the material with unknown density, and the calibrant. For example, in an embodiment, the holder is rectangular and the calibrant is affixed to the exterior of the holder. In another embodiment the holder is tubular and the material chamber, the calibrant chamber, and the channel are defined within an internal region of the tubular holder.

An embodiment relates to the construction of a density calibrant. According to one such embodiment, the calibrant is composed of three or more materials of varying density, to ensure an accurate final intensity-density calibration curve. While three calibrant-materials are used in an embodiment, inclusion of more materials can improve accuracy and precision of a calibration curve. In an embodiment, geometry of the calibration material is dictated by the sample of interest and can be in the form of a material composite strip, or in separate identifiable objects, such as calibrant spheres that are co-imaged with the material of interest. An example of the calibrant is a calibration strip composed of three polymers with established densities: poly(propylene) (abbreviated herein as PP, density=0.91 g/cm³), poly(ethylene terephthalate) (abbreviated herein as PET, density=1.38 g/cm³), and poly(tetrafluoroethylene) (abbreviated herein as PTFE, density=2.2 g/cm³). In such an embodiment, the elements that comprise the polymers are low atomic weight elements in the first two rows of the periodic table commonly found in organic compounds. This makes such calibrants suitable for measuring density of common organic materials used in pharmaceuticals and food.

A feature of an embodiment is a custom CT sample holder designed to encapsulate both the sample of interest and the calibrant. Said sample holder allows for co-imaging of the sample of interest and the density standard, i.e., calibrant-material, so both sample and density standard are within the field of view.

A further feature of an embodiment is a system for determining measured intensity histograms of reconstructed CT images. Said system has the capability of segmenting the different observed material phases at appropriate resolution and contrast, computing capability to process these images and segmentations, and storage capability to host and provide access to the imaging and segmented data.

A further feature of an embodiment is a deconvolution approach to correct the impact of diffraction artifacts on the measured intensities of the segmented imaging data including the material of interest, interstitial air void, and a calibrant.

A further feature of an embodiment is the construction of an intensity-density calibration function using the CT imaging intensities and the known densities of the materials of the calibrant. This relationship calculated in accordance with such an embodiment can be used to determine the density of the unknown material of interest in the sample that has been co-imaged with the calibrant. A further feature of an embodiment is the calculation of a 95% confidence interval of the unknown material's density, to provide a measure of uncertainty of the density computed using this method.

In an embodiment, the material phase histograms are obtained by sampling of the segmented phase intensities, binning the intensity values, and employing an algorithm to determine the appropriate quantity of bins given the size of the segmented phase voxels.

An embodiment determines an intensity-density calibration curve by calculating a linear relationship between the calibrant module densities and their deconvoluted signal intensity using at least one regression method such as least squares regression, orthogonal distance regression, and maximum likelihood estimate, amongst others. An embodiment determines the material of interest's density using the deconvoluted material histogram's intensity and the intensity-density calibration function.

To achieve the advantages described herein, amongst others, an embodiment includes, in part, the following steps:

(1) CT imaging a sample with materials of interest with unknown densities, co-imaged with a calibrant where, (1.1) The material standards with known density in the calibrant are selected and assembled based on the material(s) of interest. (1.2) A sample holder is constructed using an appropriate method and material (e.g., via 3D printing with poly(lactic acid), or acrylonitrile butadiene styrene (ABS)). (1.3) The calibrant is loaded into the sample holder such that it can be co-imaged with the material of interest. (1.4) The imaging devices can be any CT imaging method used at appropriate field of view and resolution. (1.5) The calibrant is loaded into the sample holder in a consistent manner so x-ray attenuation of material of interest is impacted by the calibrant uniformly. (1.6) The imaging instrument parameters are calibrated using the calibrant and one calibration material of interest; the calibration material of interest has a known density which is not the same as the density of the material used in the calibrant, so the density measurement is independent from the vendor, the magnification (local tomography magnification or geometrical magnification), the parameters (e.g., exposure time), and the imaging contrast (e.g., adsorption contrast or phase contrast).

(2) A three-dimensional digital representation of the co-imaged material of interest and calibrant for extraction of the CT intensities corresponding to all material phases where, (2.1) The image is segmented into the different phases using either supervised machine learning, deep learning, conventional thresholding segmentation, or any image segmentation methodology. (2.2) Intensity histograms are extracted from the segmented phases including the material phases of interest with unknown densities, interstitial air, and material phases from the calibrant.

(3) Material phase intensity histograms are corrected for artifacts where, (3.1) To correct the diffraction artifacts, the material phase histograms are deconvoluted into two underlying intensity contributions, one arising from diffraction artifacts and the other arising from tomographic interactions between the source imaging signal and the actual material. (3.2) To correct the resolution artifacts, the smallest features are deconvoluted from the larger features according to a feature size threshold in the unit of number of pixels.

(4) Material density is determined where, (4.1) An intensity-density calibration curve is calculated via regression using the intensities of the materials in the calibrant and their known material densities. (4.2) The diffraction-corrected intensity of the material phase with unknown density is located along the intensity-density calibration curve to provide an interpolated value of the material phase density. (4.3) The 95% confidence interval of the material phase density is determined from the calibration curve to provide upper and lower intensity bounds. (4.4) In case of a material of interest composed of discrete particles, a density distribution of particles over the range of particle sizes, a density of each particle, a standard deviation of each particle. (4.5) In case of a material of interest composed of continuous material phase, density distribution along any arbitrary orientations in Cartesian, cylindrical, or spherical coordinate systems.

(5) A systematic iterative refinement in case of unphysical density measurement due to diffraction heterogeneity, including (5.1). the introduction of a new calibrant with inclusion of atomic elements from $3^{rd}$ or higher rows of the periodic table, while the new calibrant material choice can be determined based on either unphysical measurement or known atomic composition of material of interest, followed by repeating the steps from (1.1) to (4.4). (5.2). geometry/shape/morphology caused diffraction heterogeneity which often requires higher resolution scans. (5.3) A mechanism of determining the method is not applicable when diffraction heterogeneity is too strong, while iterative refinement in correction causing the measurement to lose representativeness.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 3A, 3B, 3C, and 3D are top, bottom, side, and three-dimensional projection views, respectively, of an example custom 3D printed sample holder capable of imaging both the polymer density calibrant and unknown sample, with appropriate dimensions in accordance with an embodiment.

FIG. 8 is a flowchart of a method for determining density of a material according to an embodiment.

DETAILED DESCRIPTION

A description of example embodiments follows.
Overview of Example Workflow

Figure 1:
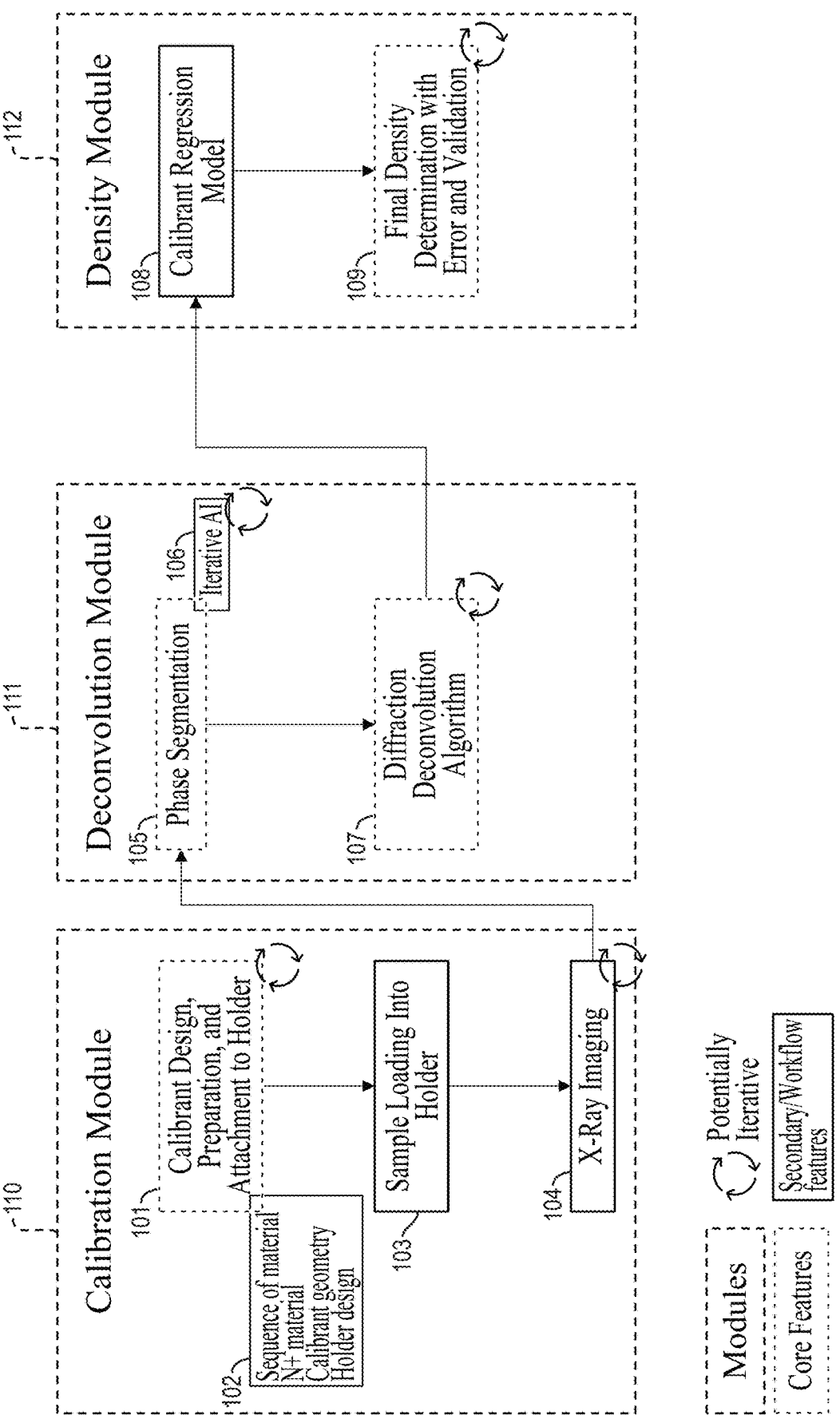
FIG. 1 is a workflow schematic block diagram of modules and features of embodiments, including a calibration module, a deconvolution module, and a density determination module, with the defined steps of each module in accordance with an embodiment.

A CT-based determination of density for materials with microscopic features, in accordance with an embodiment, utilizes three modules 110, 111, and 112, as illustrated in the workflow diagram of FIG. 1. The module 110 is a calibration module, which implements four primary steps 101, 102, 103, and 104. The module 110 begins with the initial calibrant design, followed by preparation and attachment of the calibrant to a sample holder (101 and 102). After sample loading (103) into the sample holder, CT imaging of the material of interest encapsulated in the holder loaded with the calibrant can be acquired using an appropriate CT imaging instrument, operating at the requisite resolution and contrast (104).

The functionality of the calibration module 110 is followed by the functionality of the deconvolution module 111. The deconvolution module 111 has three primary steps 105, 106, and 107. The CT images are initially segmented using an appropriate segmentation algorithm into the separate material phases (105). This segmentation (105) can be achieved and refined using iterative artificial intelligence (AI) approaches such as deep learning to improve the phase segmentation (106). The now segmented images are then subjected to a diffraction deconvolution algorithm to correct for the impact of imaging artifacts arising from diffraction artifacts (107). Following the deconvolution module 111, the data are subjected to the density module 112 which uses the calibrants to determine an intensity-density calibration curve (108), and then subsequently, determine the density of the material of interest along with upper and lower bounds on the density (109).

Calibration Module: Calibrant Design, Holder Design, and Sample Loading

The design and preparation of the calibrant and sample holder (101 and 102) in accordance with an embodiment depends on the material under investigation as well as the geometry and imaging set-up. An example of calibration design and preparation for investigating organic spherical particles is disclosed as an embodiment herein. However, it is noted that embodiments are not limited to determining the density of the materials and types of materials described herein. Polymer thin films may be selected for use as the calibrant. The polymer thin films may be selected so that variations in X-ray signal intensity arise solely from material densities and not from variations in atomic X-ray absorption spectra. Preparation of the polymer density standard (alternatively referred to as the calibrant) in accordance with an embodiment of the invention, may be achieved using poly(propylene) (PP), poly(ethylene terephthalate) (PET), and poly(tetrafluoroethylene) (PTFE). The densities of each polymer in an example embodiment are 0.91 g/cm$^3$, 1.38 g/cm$^3$, and 2.20 g/cm$^3$ respectively. These density values are well established for commercial grade PP, PET and PTFE where the PP is isotactic and semi-crystalline, the PET is fully amorphous, and the PTFE is also semi-crystalline. The polymers can be acquired commercially as uniform non-porous films with an acrylic adhesive backing, allowing for application of the films to a surface.

Figures 2A, 2B:
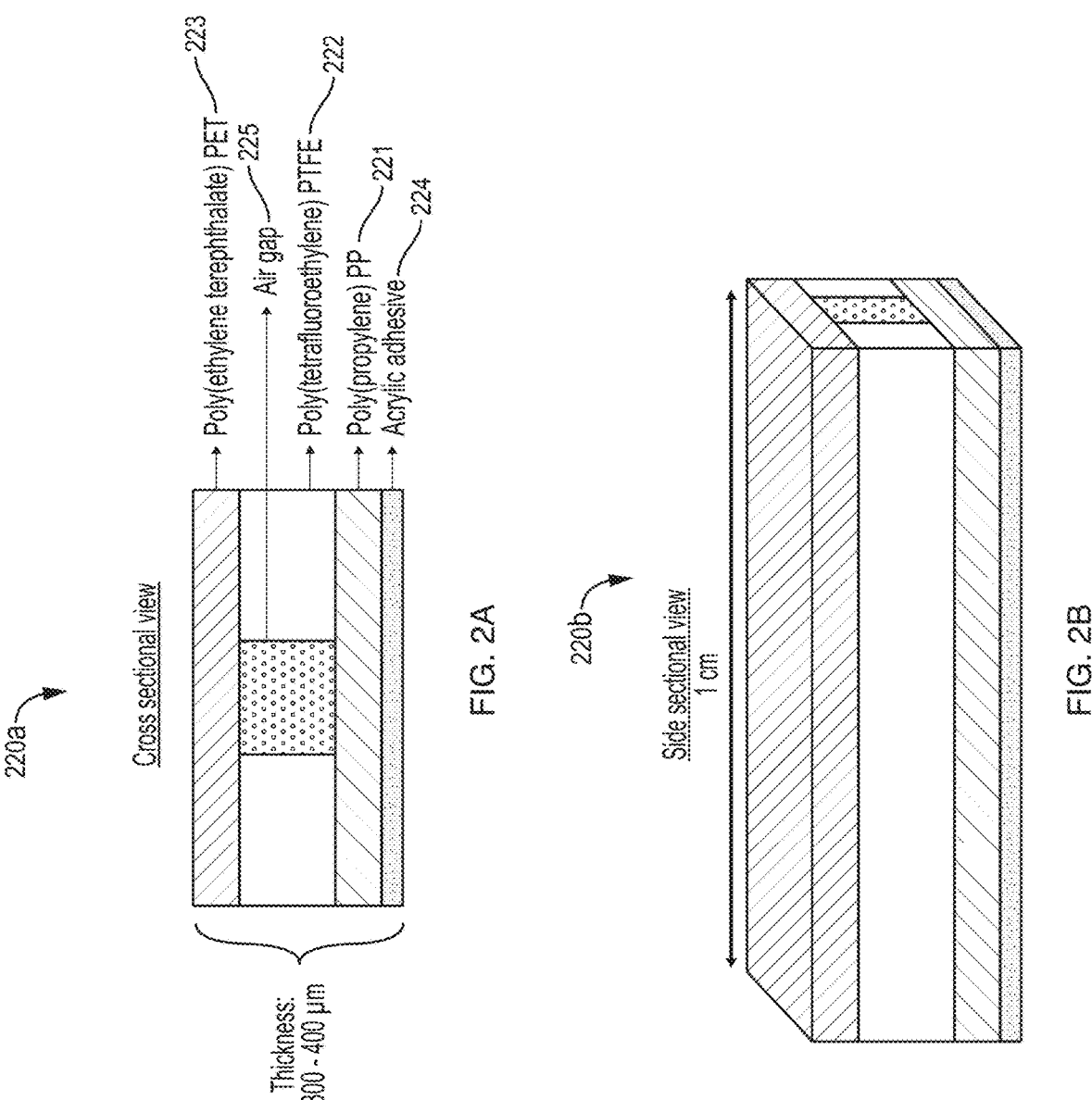
FIGS. 2A and 2B are a cross-sectional and side view, respectively, of a schematic representation of an example constructed polymer density calibrant showing three different polymer layers as well as relevant dimensions in accordance with an embodiment.

As shown in the cross-sectional view 220a and side-sectional view 220b of FIGS. 2A and 2B, respectively, in an embodiment, the composite density standard is assembled with the PP layer 221, on an adhesive 224, at the bottom followed by a PTFE layer 222, and then the PET layer 223 as shown in FIG. 2A. A gap 225 is made in the PTFE layer to ensure an isolated air pocket within the calibrant, allowing for use of air as a fourth density calibrant to increase robustness (if one calibrant failed) and add regression accuracy. The assembled 3-layer calibrant can be cut to a size appropriate for the field of view of the sample, before loading in a sample holder. In an embodiment, the calibrant polymers are selected for the density calibrants due to the spread in their densities over the range of 0.5-2.5 g/cm$^3$ and their composition of low atomic number elements. This density range is optimized to be large enough to have CT signal intensities of comparable brightness relative to an unknown organic sample, thus increasing the accuracy of material densities within the range via interpolation (as opposed to extrapolation). The range is also not too large to support reasonable sensitivity of this method.

In accordance with the calibrant and sample geometries, a custom sample holder is prepared by 3D printing, according to an embodiment, via an Ultimaker© 3 Extended 3D Printer, using poly(lactic acid) (PLA, density=1.24 g/cm$^3$). The design and dimensions of a sample holder 330 are shown in the top view 331a, bottom view 331b, side view 331c, and 3D-projection view 331d of FIGS. 3A-D, respectively.

According to an embodiment, a main compartment of the holder, e.g., 330, for housing the sample of interest is separated from a secondary compartment designed for housing the polymer calibrant strip. A small gap is left in the sample holder in the calibrant chamber to provide another undisturbed air space for further density calibration. The holder is printed with a flat side adjacent to the calibrant strip in order to provide an orientation for imaging and later registration. The calibrant is inserted into the appropriate compartment in the sample holder and any excess is trimmed. Alternative sample holders composed of different materials and different dimensions can be utilized for samples of different composition and sizes. Samples are loaded into the sample compartment of the holder (e.g., at step 103 depicted in FIG. 1). For powder and particulate samples, a funnel is used to ensure the sample does not contaminate the air gaps in the calibrant strip or the sample holder. In the case of singular samples such as implants or tablets the sample can be loaded directly.

According to an embodiment, the holder 330 is configured to consistently position and orient the calibrant. In this way, such an embodiment facilitates imaging attenuation of the material to uniformly impact the calibrant. This can improve density measurements, e.g., in an embodiment improving the determination of bone density, amongst other examples. Further, in an embodiment of the system, the calibrant is loaded into the holder in a consistent manner so that when the holder (housing the material and calibrant) is subjected to imaging, X-ray attenuation of the material is impacted by the calibrant uniformly.

Imaging of the Sample

CT imaging of the sample (e.g., at step 104) in accordance with an embodiment can be completed with appropriate CT imaging instruments. Using X-ray CT as an example, the appropriate CT image instrument includes lab scale X-ray microscopes, micro-CT instruments, nano-CT instruments, or synchrotron X-ray sources. For imaging experiments performed in accordance with an embodiment, a Zeiss Xradia 520 Versa X-ray microscope is used. An initial X-ray radiograph is taken at the beginning of the scan using an exposure of 0.5 seconds and an X-ray source energy of 80 keV. Following this initial exposure, the sample is rotated by 0.09 degrees before acquiring another radiograph at the same exposure time and X-ray source energy. This procedure is iterated to obtain 4000 radiographs. Scans are reconstructed into 3D images with 1000×1000×1000 voxels using a filtered backward projection algorithm with a bin averaging value of 2, resulting in an effective voxel size of 0.5 μm. The field of view is set to include both the sample of interest as well as the polymer density standard.

In accordance with an embodiment, 3D reconstructed images are digitally represented as grayscale images, where different regions are illuminated at different brightness based off the relative intensity of the X-ray signal. The relative intensity of the X-ray signal is determined by the number of photons that arrive at a given detector pixel which is impacted by the material composition of the sample the X-rays pass through. X-rays emitted from the primary source pass through the sample and interact with the atoms of the sample between the source and detector. X-rays that interact with atoms will become attenuated and lose energy (Swinehart [13]). This process is described by the Beer-Lambert Law, where the transmittance T of the X-ray beam is given by:

$$T = \frac{\Phi_t}{\Phi_i} = 10^{-A}$$

Where $\Phi_t$ is the transmitted X-ray flux, $\Phi_i$ is the incoming X-ray flux, and A is the absorbance of the atomic species given by the following expression:

$$A = \varepsilon\, \ell\, c$$

Where ε is the attenuation coefficient of the atomic species, $\ell$ is the optical path length the photons travel, and c is the concentration of the atomic species. The attenuation coefficient is uniquely determined by the atomic structure and form factors for a given element as well as the X-ray energy, while the optical path length is determined by the sample and instrument geometry. In light of this, for a sample with uniformly sized particles subjected to X-ray imaging at a constant X-ray source energy, the only factor that will impact the brightness of a pixel in the reconstructed image is the concentration/density of the material the photons pass through. In an embodiment, the relationship between the absorbance and the density is linear, meaning higher density materials will appear brighter than lower density materials in a linear fashion.

Deconvolution Module: Phase Segmentation Intensity Extraction

In accordance with an embodiment, the intensities of the different material phases are extracted in order to determine the intensity corresponding to each phase. In order to do this, an embodiment segments the 3D reconstructed images into the respective material phases (e.g., at step 105 of FIG. 1). Conventional segmentation methods such as intensity thresholding, water shedding, gradient-based approaches or others may be utilized. To handle the large number of 2D slices that make up the 3D imaging data, an embodiment utilizes a segmentation method that can accurately and automatically identify material phases. To achieve this high degree of accuracy and automation, an embodiment uses an artificial intelligence (AI)-based image segmentation method. According to an embodiment, an AI image segmentation model is trained, e.g., by a human operator, to identify which pixels correspond to which material phase, using a number of criteria including intensity, location, shape, and relationship to its neighboring pixels. Once the AI model is trained, the model is automatically applied to the set of images that comprise the 3D image of the current sample, or images from different samples calibrated to the same intensity range. The segmentation results can be further refined using iterative AI approaches such as deep learning methods (e.g., at step 106). A full description of an AI based approach that can be utilized in embodiments is found here (Zhang [16]).

Deconvolution Module: Intensity Histogram Deconvolution

Figures 4A, 4B, 4C, 4D:
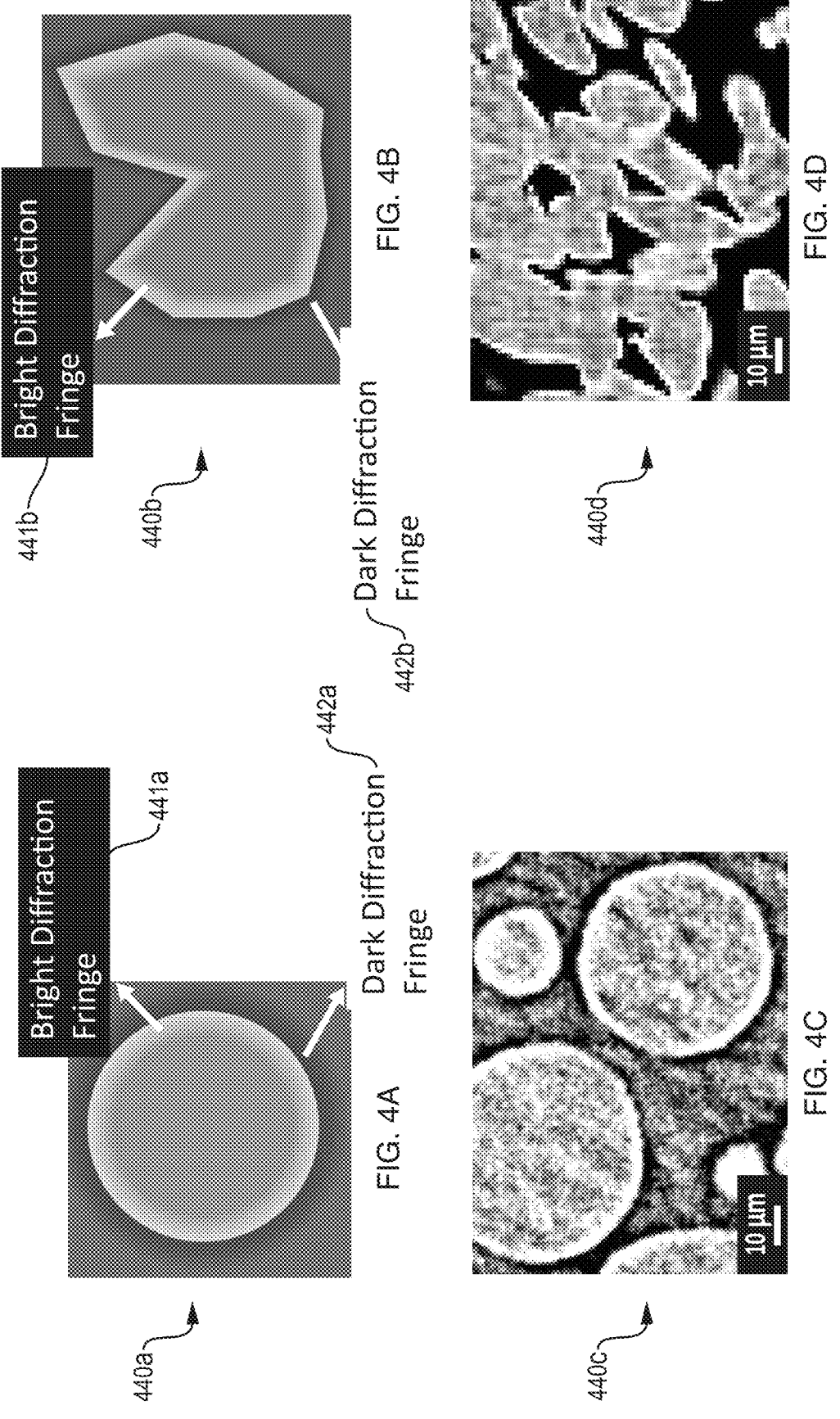
FIG. 4A is a pictorial representation of the influence of one kind of diffraction artifact, called Fresnel diffraction, on a microsphere, with the bright and dark fringe artifacts indicated.
FIG. 4B is a pictorial representation of Fresnel diffraction artifacts for an irregularly shaped micro-particle in accordance with an embodiment.
FIG. 4C is a grey-scale X-ray MicroCT image of polymer microspheres showing the Fresnel diffraction fringes for spherical particles across the entire 3D field of view of the image.
FIG. 4D is a grey-scale X-ray MicroCT image of sintered glass beads showing Fresnel fringes for non-uniform particles.

In accordance with an embodiment, the intensity histograms are subjected to a pre-processing step prior to determination of an intensity-density relationship (107). In conventional optical microscopy as well as XRM and CT, images are subject to diffraction effects that can alter the intensity of light near the edges of an imaged object. The Fresnel number, $N_F$, of an electromagnetic wave that has passed through an aperture and landed at a detector is given by:

$$N_F = \frac{a^2}{L_{eff}\lambda}$$

Where a is the radius of the aperture the light has passed through, λ is the wavelength of the incident light at the detector, and $L_{eff}$ is the effective distance of the light to the detector given by the expression:

$$L_{eff} = \frac{d_{SD} * d_{SS}}{d_{SD} + d_{SS}}$$

Where $d_{SD}$ is the sample to detector distance, and $d_{SS}$ is the source to sample distance (Kalasová et al. [6]). When $N_F$ is much greater than one, the light beam is in the near field regime. For most conventional X-ray imaging setups, the small wavelength of the X-ray photons ensures that a majority of the image is in the near-field approximation. As $N_F$ gets closer to one, this approximation begins to break-down and significant effects due to diffraction can become present in the final detected image. These diffraction effects appear as variations in intensity near the edge of a material/object at the detector and are known as Fresnel diffraction artifacts. Examples of Fresnel diffraction for spherically imaged particles 440a and irregularly shaped particles 440b are graphically illustrated in FIG. 4A and FIG. 4B, respectively. FIG. 4C and FIG. 4D show real XRM images of organic microspheres and sintered glass particles, respectively. A brighter/high intensity band 441a-b is observed inside the particle near the edge, while a darker/low intensity band 442a-b is observed adjacent to the brighter band in the surrounding medium. In the case of clinical CT scans, the features of interest tend to be on the scale of mm to cm, ensuring minimal impact of Fresnel diffraction. In the case of objects with microscopic features observed with XRM, the features of interest can be on the order of microns, resulting in significant artifacts due to Fresnel diffraction (Kalasová et al. [6]). For quantitative analysis using intensities from segmented images, this effect requires correction.

Figure 5:
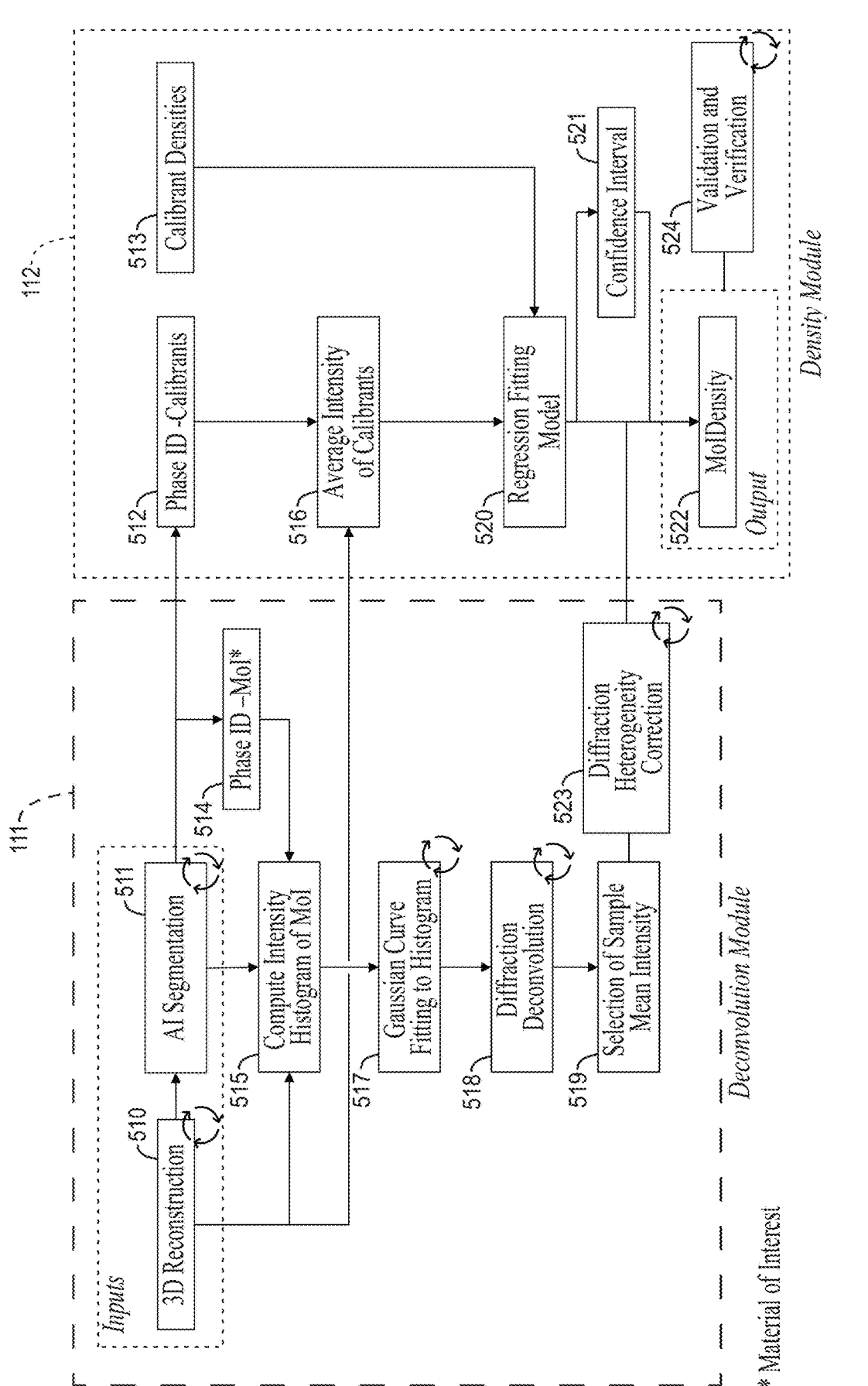
FIG. 5 is a schematic block diagram of a computational workflow and functionalities used on segmented CT images to correct for diffraction artifacts and construct the intensity-density relationship so as to determine unknown density in accordance with an embodiment.

In accordance with an embodiment, correction functionality is employed that corrects for Fresnel diffraction and other intensity modulating artifacts that are diffraction-based in nature such as beam hardening (e.g., at step 107). The workflow schematic of such correction functionality, according to an embodiment (which may be performed at step 107 by the deconvolution module 111), is shown in FIG. 5. The correction functionality takes the 3D reconstructed images (510) and the AI segmentation (511), as the initial inputs to extract out the material phase label (514). The intensity histogram of the material of interest is computed (515) using these initial images (510) and the material phase ID (514) extracted from the AI segmentation input (511). In an embodiment, this computation is done by counting the total number of voxels of the material label and determining their intensity value from the 3D reconstructed image. The voxel intensities are then sorted into intensity bins, where the total number of bins is, in an embodiment, at least 1000 bins. Given the large number of voxels in an imaging set (~109 voxels) fewer than 1000 bins is likely to produce intensity histograms that are not representative of that given material label. The number of bins can be manually set to an empirically determined minimal number, defaulted to 1000, or an algorithmic procedure for automatic binning.

Figure 6:
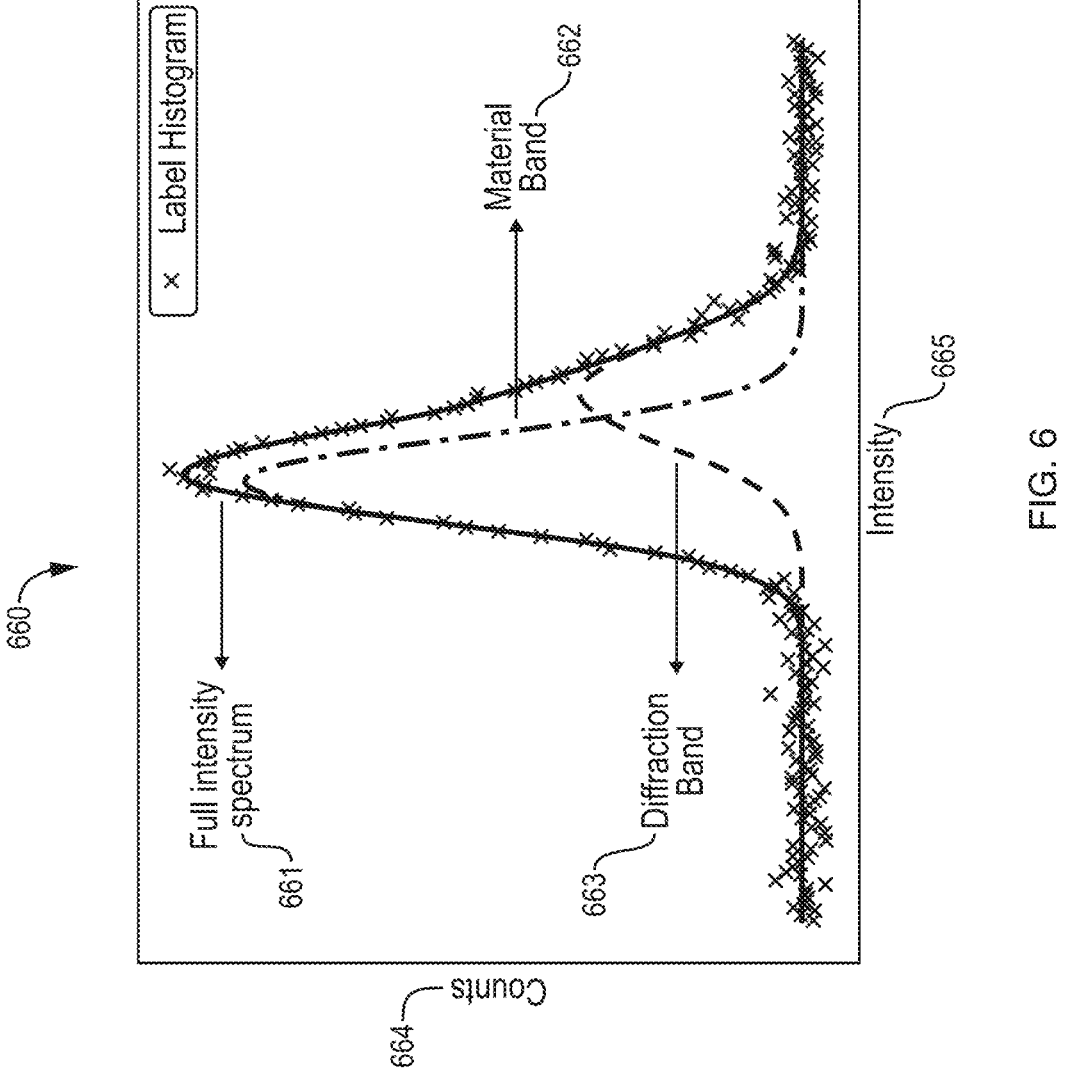
FIG. 6 is a graphical representation of deconvolution of a histogram of a material phase corresponding to a material label via segmentation, where the raw histogram is plotted in addition to the underlying two Gaussian bands corresponding to the material and diffraction artifacts, in accordance with an embodiment.

The histogram of the material of interest is then subjected to a Gaussian fitting (517) and deconvolution (518) algorithm. The Gaussian fitting (517) calculates an initial best Gaussian function to fit to the histogram, from which the mean, the height, and the standard deviation are extracted. The deconvolution algorithm (518) operates by taking the initial best Gaussian fit (517) as the initial condition, and iteratively deconvoluting the Gaussian fit into a sum of two (or more) underlying Gaussian functions, so that the combined two (or more) Gaussian functions improves the fit to the histogram:

$$I_{tot} = I_M + I_A$$

Where $I_{tot}$ is the best combined Gaussian fit of the intensity histogram of the segmented material phase, $I_M$ is the Gaussian fit of intensity contribution from the underlying actual material, and $I_A$ is the Gaussian fit of intensity contribution corresponding to imaging artifacts. The underlying material and artifact intensities are assumed to be Gaussian distributions of the form:

$$I_i = M_i e^{\frac{-(x-\mu_i)^2}{2\sigma_i^2}}$$

Where $M_i$ is the amplitude of the $i^{th}$ Gaussian, $\mu_i$ is the mean of the $i^{th}$ Gaussian, and $\sigma_i$ is the standard deviation of the $i^{th}$ Gaussian. The total histogram is fit to this sum of Gaussians, using an appropriate curve-fitting algorithm (517), such as least-squares fitting, orthogonal distance regression, or the method of maximum likelihood estimators, amongst other examples. According to an embodiment, the fitting parameters are the amplitude, mean, and standard deviations of the underlying Gaussians. In the previous example where the histogram of the material was deconvoluted into 2 Gaussians, one for the actual material, and one for the Fresnel artifact, a total number of six fit parameters was determined. Assuming a minimum bin number of 1000 bins this system has a minimum number of degrees of freedom 993, ensuring the fit is not over-constrained. Embodiments are similarly justified in assuming Gaussian distributions for the fit, as the number of voxels corresponding to each phase is large enough that the central limit theorem is applicable. An example of this deconvolution and fitting procedure is shown in the plot 660 of FIG. 6 for an organic microsphere sample. The plot 660 is a histogram plot of counts 664 versus intensity 665 where the series 661 corresponds to the full intensity spectrum, the series 662 corresponds to the material, and the series 663 corresponds to the diffraction.

Following fitting (517) and deconvolution (518), the constituent Gaussian curve that corresponds to the material phase is determined (519). In the case of the organic microsphere phase identified in FIGS. 4A and 4C, the Gaussian with lower mean intensity corresponds to the material phase while the Gaussian with higher mean intensity corresponds to the diffraction band. Conversely for the segmented air phase adjacent to the microspheres in FIGS. 4A and 4C, the lower intensity band near the microsphere corresponds to the diffraction band while the higher intensity peak corresponds to the underlying air phase.

Further, an iterative refinement can be implemented to manage diffraction heterogeneity that arises from scale heterogeneity and resolution limitation (523). The diffraction heterogeneity correction (523) may implement the repeating of determining the calibrant design (selecting an alternative at step 101), conducting alternative imaging (at step 104), performing an alternative 3D reconstruction (510), performing an alternative AI segmentation (511), and performing an alternative diffraction deconvolution (518). Density Module: Linear Intensity-Density Determination and Density Measurement In accordance with an embodiment, the intensities of the polymer calibrants are used to construct an intensity-density calibration curve as the first step (108) of the density module 112. As discussed previously, in the case of materials with the same elemental composition, X-ray image intensity depends on the optical path length of the X-rays and the number of atoms the X-ray beam will interact with. In the case of computed tomography methods such as XRM and micro-CT, the sample is held at a constant distance between the source and detector, ensuring the only optical path length variations will occur within the sample. Furthermore, during a CT scan, the sample is rotated in order to collect radiographs over multiple orientations, ensuring that the optical path length variations within the sample are averaged out. The X-ray absorbance will hence depend on the concentration of the atomic species within the sample as described by the Beer-Lambert law. Given the form of the Beer-Lambert law, the overall X-ray absorbance and therefore intensity of the final image will be linearly dependent on density.

In light of this linear intensity-density relationship and in accordance with an embodiment, the intensities of the density calibrants are used to construct an explicit linear relationship between density and X-ray intensity as shown in FIG. 5. The construction of the linear relationship may be implemented at step 108 described hereinabove in relation to FIG. 1. The inputs used to determine the linear relationship are the 3D reconstructed image and the AI segmentation of the different phases (510 and 511). These inputs (510 and 511) are used to identify the calibrant phases (512) and determine the average intensity of the calibrants in the image (516). The average intensity of the calibrants in the image (516) is used in conjunction with the a priori known calibrant densities (513) to obtain a calibration curve through an appropriate linear regression model, such as least squares or orthogonal distance regression (520). For the case of organic microspheres with a composite polymer calibrant, the polymer standard segmentations are taken as the brightness of that given phase. The order of the polymer density standards, (i.e., calibrants) in the 3-layer composite is known, and from this, the known polymer density is plotted as a function of their X-ray intensity. Furthermore, the intensity of the undisturbed air within the 3-layer calibrant or in the prepared sample holder channel is also plotted with its known density of 0.0012 g/cm³ at STP. With these four points (intensity of the 3 calibrant layers and air versus the known density of the calibrant layers and air), a linear relationship is obtained using a least squares regression. This linear relationship serves as a calibration curve and allows for direct comparisons between CT scans from different instruments or at different times, which can result in differences in measured intensity due to experimental/instrumental variations or from reconstruction variations.

Figure 7:
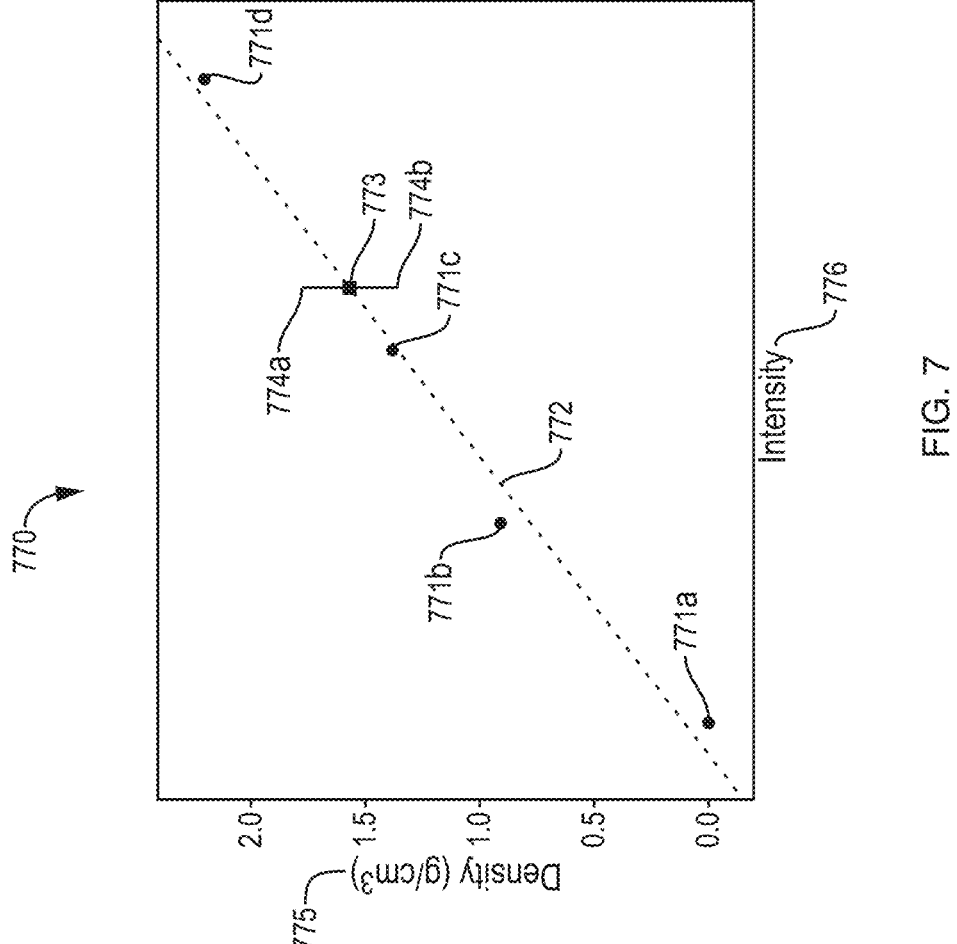
FIG. 7 is a graphical representation of a constructed density-intensity linear relationship (dotted line) using known polymer and air densities (shown in circles) and the determination of an unknown material's density based on its CT image intensity (square) along with the upper and lower bounds on density (error bars) in accordance with an embodiment.

An example of the density of the calibrants 775 plotted as a function of their intensity 776 is shown in the plot 770 of FIG. 7. In the plot 770 the calibrants are the circles 771*a-d* and the derived linear relationship is the dotted line 772.

In accordance with an embodiment, the density of the unknown material can be determined using this density-intensity relationship (109), e.g., the line 772 from FIG. 7. In an embodiment, the diffraction corrected intensity of the material phase (523) is used with the calibration curve (determined at 520) to calculate the density of the phase, i.e., material of interest, (522). An example of this is shown in FIG. 7 where the unknown material density is shown as the square 773 where the square 773 is placed on the line 772 based on the intensity 776 of the unknown material. The uncertainty in this density 773 measurement is determined by assessing the 95% confidence interval of the linear regression (521), which gives the upper and lower range of potential material density. In the plot 770, the 95% confidence in the density 773 is shown by the error bars 774*a-b*. The 95% confidence interval is obtained by initially performing the regression assuming a two-parameter linear model (e.g. slope and intercept). The specific significance level is specified by the user; in the case of the 95% confidence interval this corresponds to a significance level of 0.05. From this significance level, the appropriate test statistic is determined using a student's t-test. Next, the covariance matrix of the regression is determined based on the given fit parameters, while the maximum residual between the fit and data is determined. The 95% confidence interval of the regression is then obtained by multiplying the test statistic by the square root of the sum of the max residual squared plus the determinate of the covariance matrix. This assessment provides a region of values in the vicinity of the regression that are statistically acceptable values of the regression for a given input. In the case of the intensity-density regression, this allows for the determination of upper and lower bounds on the density of a material given a measured CT intensity. A more detailed description of confidence interval determination is given elsewhere (Bevington and Robinson [1]).

Further, an iterative refinement for validation and verification (524) is performed when results (522) are inaccurate. The validation and verification 524 may implement the repeating, i.e., the iterating, of determining the calibrant design (selecting an alternative calibrant design (at 101), conducting alternative imaging (iterating 104), performing an alternative 3D reconstruction (iterating 510), performing an alternative AI segmentation (iterating 511), performing an alternative diffraction deconvolution (iterating 518), and performing an alternative diffraction heterogeneity correction (iterating 523).

FIG. 8 is a flowchart of a computer-implemented method 880 for determining density of a material according to an embodiment. The method 880 begins at step 881 by segmenting imaging data of a material and a calibrant into a plurality of phases, e.g., intensity phases using an image segmentation method such as AI Segmentation (511). For each of the plurality of phases, a respective histogram is determined at step 882 based on pixel intensity of obtained imaging data corresponding to the phase, i.e., using the imaging data that was segmented at step 881. To continue, at step 883 a given histogram corresponding to a phase of the material is deconvoluted into (i) a function corresponding to artifacts, e.g., intensity of the artifacts and (ii) a function corresponding to the material, e.g., intensity of the material. Next, at step 884, a relationship between density and pixel intensity is determined using one or more histogram corresponding to the calibrant. This determined relationship is applied, at step 885, to the function corresponding to the material, e.g., the function corresponding to the intensity of the material from step 883, to determine density of the material.

An embodiment of the method 880 obtains the imaging data of the material and the calibrant by subjecting the material and the calibrant, in a sample holder, to a CT imaging.

According to an embodiment, segmenting the imaging data at step 881 comprises at least one of: (i) segmenting the imaging data based on intensity, (ii) segmenting the imaging data based upon gradients, and (iii) segmenting the imaging data by processing the imaging data with at least one of a machine learning algorithm or artificial intelligence algorithm to identify data corresponding to each phase of the plurality of phases.

In an example embodiment, deconvoluting the given histogram corresponding to a phase of the material at step 883 includes performing an analysis, e.g., a regression analysis, to deconvolute, i.e., fit, data of the given histogram to (i) the function corresponding to artifacts and (ii) the function corresponding to the material. Further, it is noted that embodiments of the method 880 are not limited at step 883 to deconvoluting a single histogram to a single function corresponding to artifacts and a single function corresponding to the material and, instead, multiple histograms resulting from the imaging data can be deconvoluted at step 883 to multiple functions corresponding to multiple different artifacts and multiple functions corresponding to multiple materials, e.g., material phases of a sample for which density is being determined. For example, an embodiment may deconvolute, at step 883, the given histogram into (i) multiple functions corresponding to multiple different artifacts and (ii) multiple functions corresponding to multiple materials.

In embodiments of the method 880 the calibrant may include a plurality of calibrant-materials (i.e., standard materials) each with a respective known density. In one such embodiment of the method 880, determining the relationship between density and pixel intensity using one or more histogram corresponding to the calibrant (at step 884) includes determining average pixel intensity for each of the plurality of calibrant-materials using respective histograms corresponding to each of the plurality of calibrant-materials. In turn, the relationship is determined at step 884 using the average pixel intensity determined for each of the plurality of calibrant-materials and respective known densities of each of the plurality of calibrant-materials. According to an embodiment, determining average pixel intensity for each of the plurality of calibrant-materials using respective histograms corresponding to each of the plurality of calibrant-materials comprises deconvoluting each histogram corresponding to each of the plurality of calibrant-materials into (i) an artifact function and (ii) a calibrant-material function. The average pixel intensity of each of the plurality of calibrant-materials is then determined using corresponding calibrant-material functions. According to an embodiment, the determined relationship (determined at step 884) is a mathematical function, e.g., a linear function, between the average pixel intensity determined for each of the plurality of calibrant-materials and the respective known densities of each of the plurality of calibrant-materials.

Embodiments of the method 880 may also perform various additional functionalities (alone or together). For instance, an embodiment determines average density of the material. Embodiments can also determine uncertainty in the determined density. Further still, responsive to the material being composed of discrete particles, an embodiment of the method 880 determines a density distribution of the particles over a range of particle sizes, a density of each particle, and a standard deviation of each particle. Responsive to the material being composed of continuous material phase, embodiments can determine a density distribution along arbitrary orientations in at least one of: a Cartesian coordinate system, a cylindrical coordinate system, and a spherical coordinate system. Further, it is noted that in an embodiment of the method 880, the foregoing functionality may be implemented at step 885 as part of determining the density of the material.

Embodiments of the method 880 may also be configured to implement a systematic iterative refinement where an unphysical density measurement caused by diffraction heterogeneity is experienced. For instance, an embodiment of the method 880 may identify that the density determined at step 885 is unphysical and, in response to identifying the determined density is unphysical, determine corrected density (e.g., through an iterative refinement) or determine a corrected density cannot be identified (e.g., the method 880 cannot accurately determine density). Further, an embodiment of the method 880 may include functionality to determine that the output value, i.e., density, is not physically correct, and such an embodiment may include functionality to suggest how to obtain physically accurate results.

According to an example embodiment of the method 880, determining corrected density (e.g., in response to determining that the density determined at step 885 is unphysical) comprises at least one of: (i) generating corrected imaging data by processing the imaging data using a feature size threshold to remove resolution artifacts and repeating the segmenting (step 881), determining a respective histogram (step 882), deconvoluting (step 883), determining a relationship (step 884), and applying (step 885) using the corrected imaging data; (ii) obtaining new imaging data of the material and a new calibrant and repeating the segmenting (step 881), determining a respective histogram (step 882), deconvoluting (step 883), determining a relationship (step 884), and applying (step 885) using the new imaging data; and (iii) obtaining higher resolution imaging data that corrects for at least one of geometry, shape, and morphology caused heterogeneity, and repeating the segmenting (step 881), determining a respective histogram (step 882), deconvoluting (step 883), determining a relationship (step 884), and applying (step 885) using the higher resolution imaging data.

In an embodiment of the method 880, the iterative refinement may include: (i) correcting resolution artifacts by a feature size threshold in a unit of number of pixels, to exclude small particle features that are not fully resolved to give accurate density measurements, thus convoluting total density measurements; (ii) introducing a new calibrant with inclusion of atomic elements from third or higher rows of the periodic table, while the new calibrant material choice is determined based on either unphysical measurement or known atomic composition of material of interest, followed by repeating the workflow (i.e., repeating the segmenting, determining a respective histogram, deconvoluting, determining a relationship, and applying); and (iii) a correction on geometry, shape, and morphology caused diffraction heterogeneity which often requires higher resolution scans.

While embodiments of the method 880 may be configured to implement a systematic iterative refinement, embodiments may also be configured to determine the method 880 is not applicable. Amongst other examples, such an embodiment may determine the method 880 cannot determine density when diffraction heterogeneity is too strong.

The discussion below presents validation results of embodiments, e.g., the workflow of FIG. 1, the workflow of FIG. 5, and the method 880 of FIG. 8, amongst other examples.

Figure 9B:
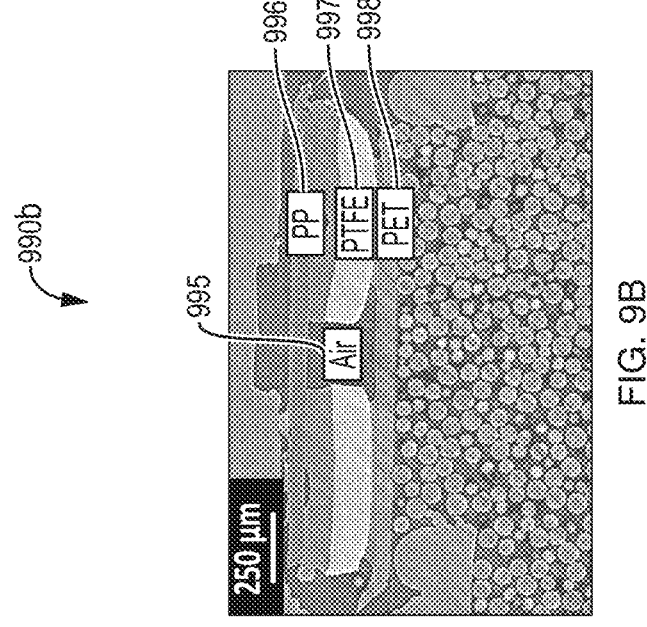
FIG. 9B is a zoomed in view of the polymeric calibrant of FIG. 9A indicating the specific polymers used.
Figure 9A:
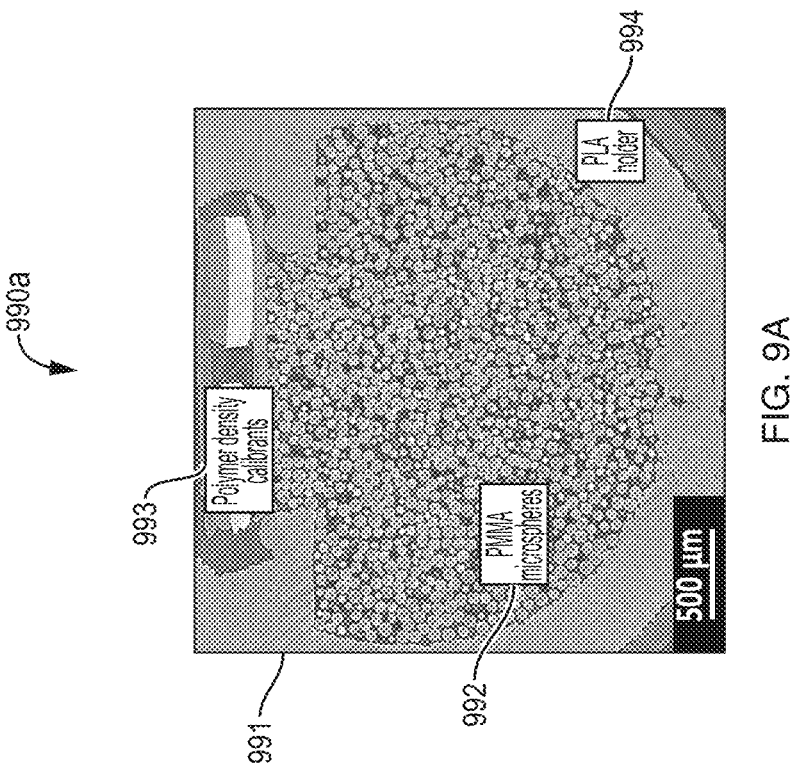
FIG. 9A depicts a representative 2D slice of a reconstructed x-ray microscopy (XRM) scan of Poly(methyl methacrylate) (PMMA) microspheres co-imaged with polymeric calibrant in a custom 3D printed PLA holder.

Validation Case Study 1: Poly(Methyl Methacrylate) (PMMA) Microspheres Imaged with Lab-Based X-Ray Microscopy Experiment Summary PMMA microspheres (Cospheric LLC, Santa Barbara, CA) with a listed size distribution of 25-75 μm were imaged using a lab-based X-ray microscope (Bruker, Billerica, MA) at a resolution of 1.25 μm per voxel to measure the density of the microspheres using embodiments, e.g., the method 880. The density of PMMA is known in literature to be 1.19 g/cm$^3$, and the spheres as prepared by solution polymerization are anticipated to have negligible porosity, resulting in microspheres with anticipated uniform density. The microspheres were loaded into a 3D printed poly(lactic acid) PLA sample holder, where a multi-layer film of known polymeric density calibrants was loaded into the holder at the same time. The chosen calibrants were polypropylene (PP, 0.90 g/cm$^3$), poly(ethylene terephthalate (PET, 1.38 g/cm$^3$), and polytetrafluoroethylene (PTFE, 2.22 g/cm$^3$). FIGS. 9A-B are views 990*a-b* of a slice 991 from the reconstructed image volume showing the different features of the imaging container. Specifically, FIG. 9A shows a representative 2D slice 991 of a reconstructed X-Ray Microscopy (XRM) scan of Poly(methyl methacrylate) (PMMA) microspheres 992 co-imaged with a polymeric calibrant 993 in a custom 3D printed PLA holder 994. FIG. 9B is a zoomed in view 990*b* of the polymeric calibrant 993 of FIG. 9A indicating the specific polymers used, namely air 995, PP 996, PTFE 997, and PET 998.

Figures 10A, 10B:
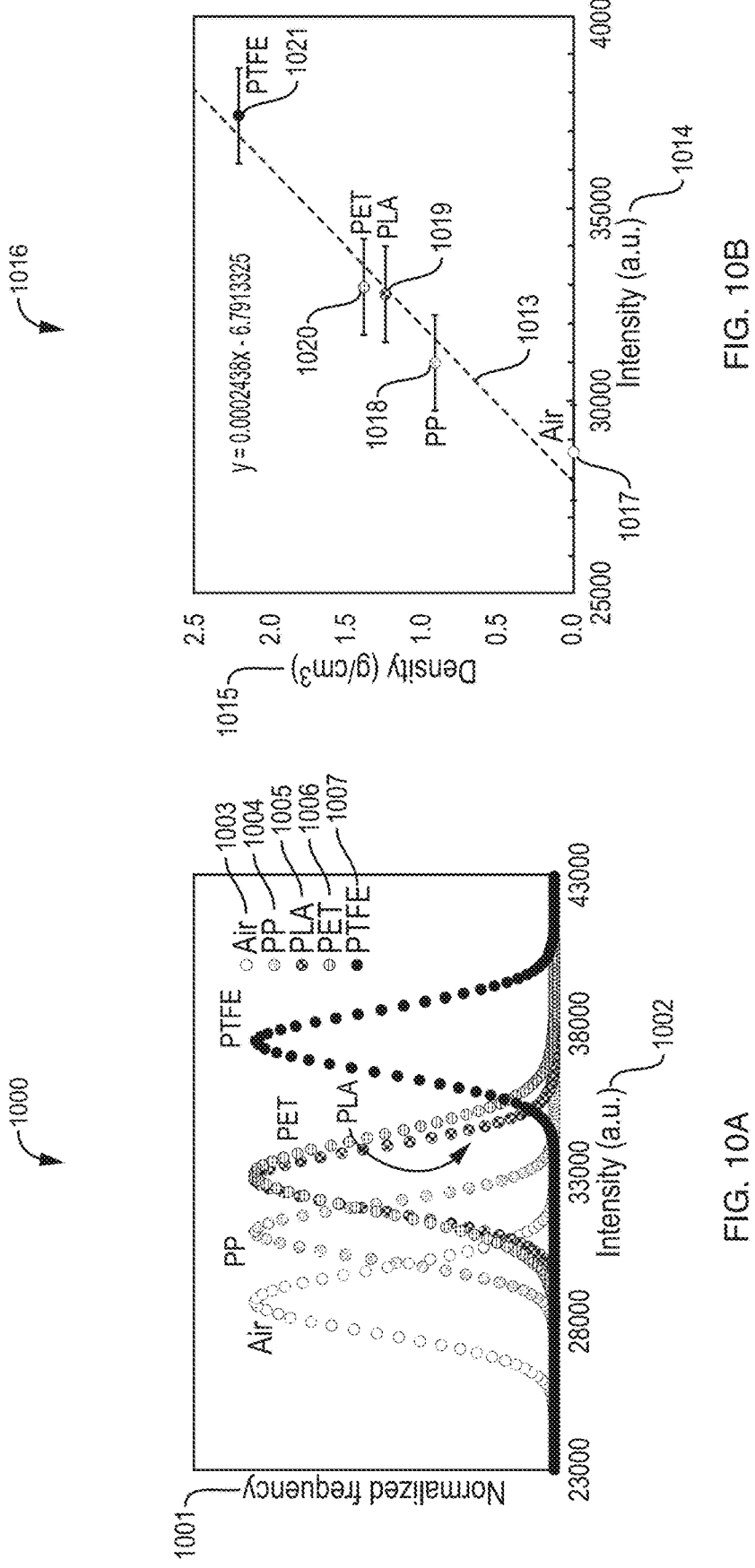
FIG. 10A illustrates intensity histograms for five calibrant materials segmented from images according to an embodiment.
FIG. 10B is a plot of known calibrant density as a function of mean intensity, along with a linear model.
Figure 11:
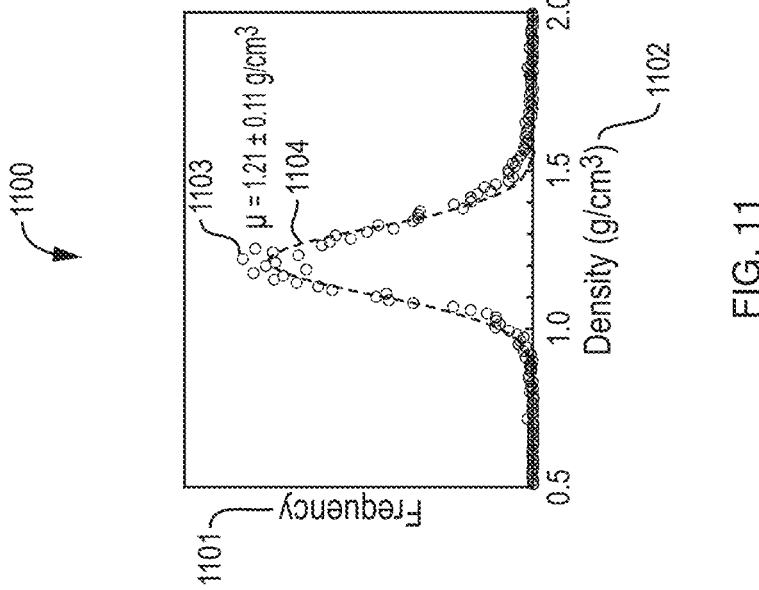
FIG. 11 is a density histogram for deconvoluted PMMA spheres (circles) and fit to Gaussian distribution (line).

To continue this illustrative example, following the imaging and reconstruction, the different material phases as observed in the image were segmented using supervised machine learning. From the segmented image labels, intensity histograms for the polymeric calibrants (PP 996, PTFE 997, and PET 998) were extracted as well as the intensity histograms for the entrapped air (995) as well as the PLA of the sample holder 994 material for use as additional density calibrants ($\rho_{air}$=0.0012 g/cm$^3$ at STP, and $\rho_{PLA}$=1.25 g/cm$^3$). The intensity histograms for the calibrants are shown in the plot 1000 of FIG. 10A. The histograms were normalized to allow for ease of comparison. The plot 1000 shows normalized frequency 1001 versus intensity 1002 histograms for air 1003, PP 1004, PLA 1005, PET 1006, and PTFE 1007. All five histograms (1003-1007) have similar widths, indicating that an appropriate number of pixels was obtained to produce a representative sample of the material for subsequent calculations. The mean and standard deviations of the calibrant histograms 1003-1007 were used along with the known calibrant densities to determine a linear relationship 1013 between intensity 1014 and density 1015 as implied by Beer's Law. The linear model (R$^2$=0.96) 1013 is shown in the plot 1016 of FIG. 10B. The plot 1016 shows density 1015 versus intensity 1014 for air 1017, PP 1018, PLA 1019, PET 1020, and PTFE 1021. Error bars in the plot 1016 are the standard deviation of the histograms 1003-1007.

With the conversion from intensity to density obtained (i.e., the linear model 1013), the microsphere phase was subjected to the Gaussian deconvolution pre-processing step to mitigate the impact of Fresnel diffraction. Fresnel diffraction presents as a brighter fringe at the interface of the air and microspheres (as described hereinabove in relation to FIGS. 4A-D). Gaussian deconvolution was performed on the histogram of each sphere to separate out the contribution from diffraction from the true material intensity. Following the deconvolution, the density of each sphere was calculated and binned to produce a density histogram for the microsphere sample. The density histogram is shown in the plot 1100 of frequency 1101 versus density 1102 where the circles, e.g., 1103, represent data for microspheres and the line 1104 is a fit to a Gaussian distribution. The mean density 1102 is shown to be 1.21±0.11 g/cm$^3$, which is a difference of 1.7% from the literature value of 1.19 g/cm$^3$.

Findings

The above-described validation case served to address four aspects of embodiments:

A. A proof of concept of the validity of the density measurement technique on isotropic particles with known density.

B. The feasibility of performing co-imaging of the microscopic sample with appropriate density calibrants while ensuring both representativeness.

C. The importance of deconvolution to correct for diffraction-based artifacts.

D. Critically assess the impact of particle size and imaging resolution on the accuracy of the density measurement.

The above-described experiment was successful for aspects A (proof of concept) and B (feasibility of co-imaging) and, as such, shows successful operation both from an imaging standpoint (e.g. successful acquisition of imaging data containing both the calibrant materials and sample representatively), as well as a method validation (e.g., accurate density measurement of the PMMA spheres).

Figure 12:
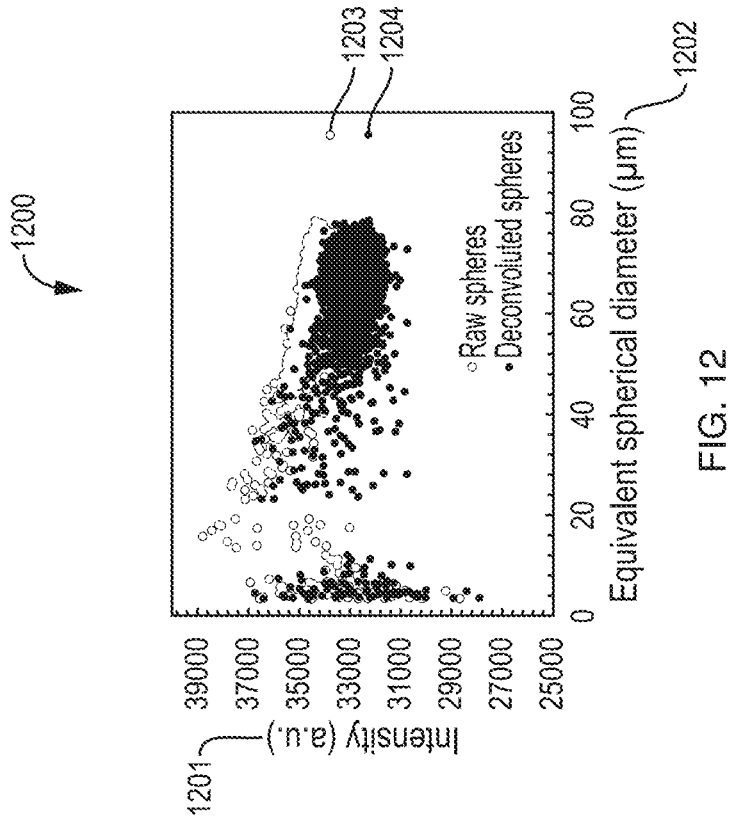
FIG. 12 is a plot of intensity as a function of equivalent spherical diameter for the PMMA microspheres before deconvolution (light-shaded symbols) and after deconvolution (dark-shaded symbols).

For aspect C, the deconvolution was demonstrated to be important to alleviate the impact of diffraction. The plot 1200 of FIG. 12 shows the intensities 1201 versus equivalent spherical diameters 1202 of the raw microsphere phase (lighter shaded series 1203) and the deconvoluted spheres (darker shaded series 1204). Deconvolution served to reduce the overall intensity 1201 of the spheres without disturbing the underlying distribution of spheres, and resulted in accurate measurement of the density of the microspheres. Without deconvolution, the microsphere density will be unphysically high due to diffractions.

Aspect D was addressed as well in the foregoing example implementation. The resolution of the images was 1.25 µm/voxel, while the microspheres showed an average diameter of 60 µm. This imaging resolution and this particle size was demonstrated to be sufficient for accurate density determination, suggesting that for microscopic samples, spherical particles 50 times larger than the imaging resolution can accurately be investigated. Furthermore, at this resolution each layer of the calibrant materials could be identified and segmented. The smallest calibrant layers of PP and PET were 50 µm thick, while the PTFE was 125 µm thick. At these thicknesses, the resolution was sufficient to capture a large enough sampling of calibrant pixels to perform the calibration. Therefore, the resolution criteria for the calibrants is that the resolution of the image should be at least 20 times smaller than the thinnest calibrant layer used. The resolution aspect of embodiments is further demonstrated in the next example case study where a synchrotron x-ray source was used at a higher resolution.

Figure 13B:
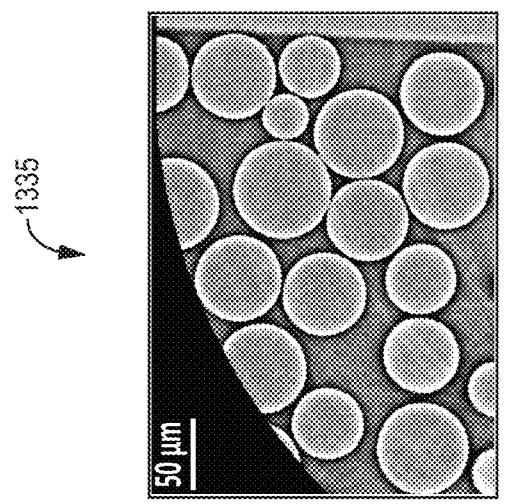
FIG. 13B is a zoomed in view of the 2D slice of FIG. 13A.
Figure 13A:
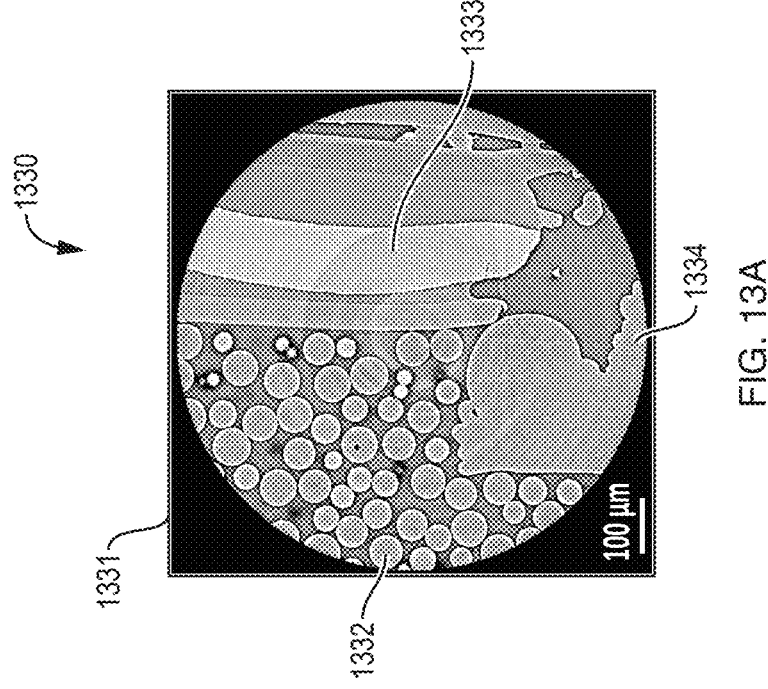
FIG. 13A depicts a representative 2D slice of reconstructed images obtained from a synchrotron light source.

Validation Case Study 2: Poly(Methyl Methacrylate) (PMMA) Microspheres Imaged with Synchrotron X-Ray Source Experiment Summary In the below case study the same PMMA microspheres, with the same calibrants, in the same holder, as discussed in the previous validation case study were imaged at a synchrotron X-ray source (Canadian Light Source, Saskatoon, Canada) at 0.34 µm/pixel resolution. FIG. 13A is a view 1330 depicting a representative 2D slice 1331 of reconstructed images obtained from the synchrotron light source. The view 1330 of the slice 1331 shows the spheres 1332 along with the calibrants 1333, and holder 1334. FIG. 13B is a zoomed in view 1335 of the 2D slice 1331 of FIG. 13A.

In this experiment the workflow was kept the same as the previous case study, whereby the image was segmented to determine the different material phases, followed by the correlation of intensity to true material density using the method disclosed herein, e.g., the method 880.

Figures 14A, 14B:
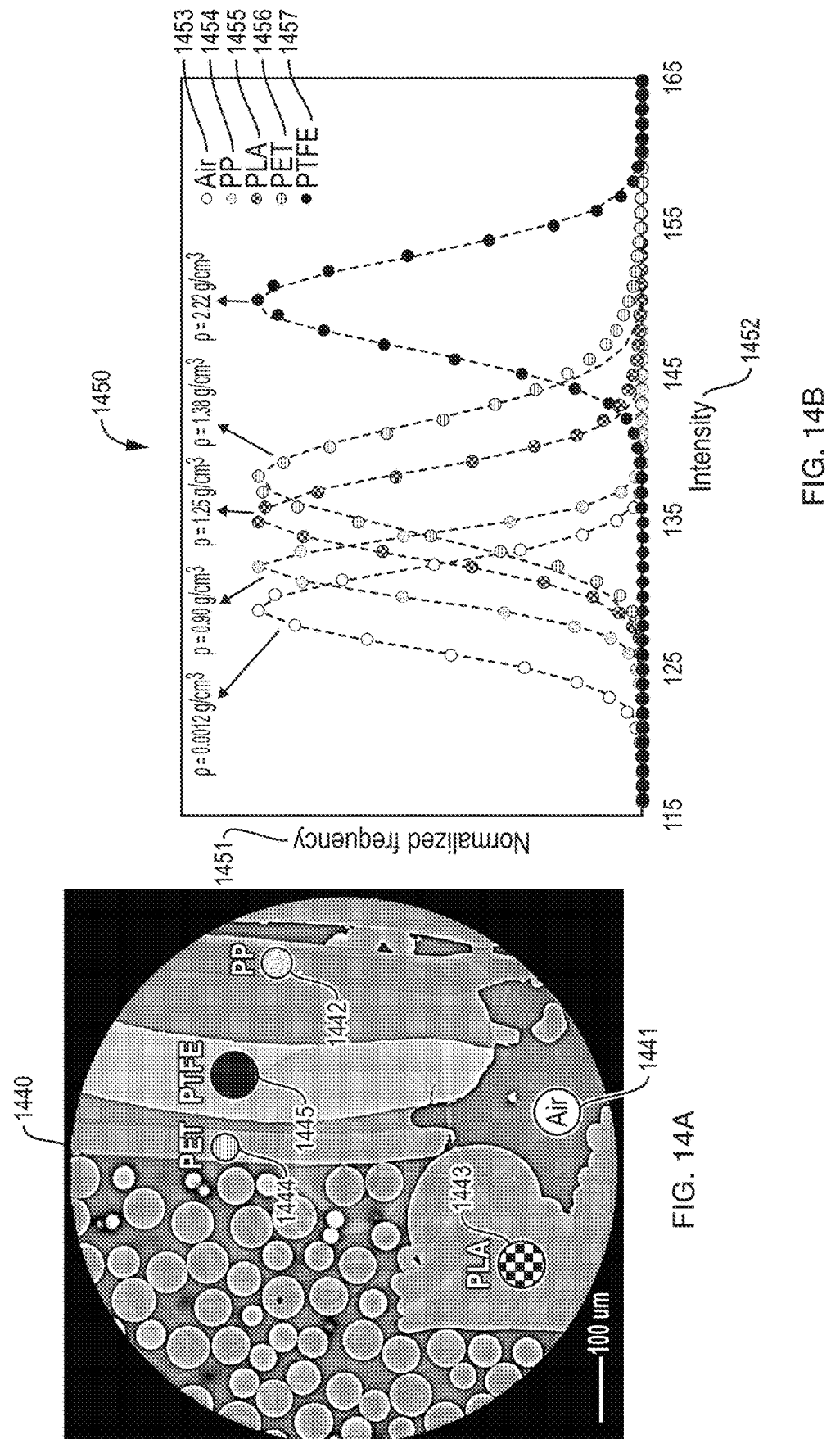
FIG. 14A is a XRM image with indicated calibrant phases.
FIG. 14B are calibrant histograms for the calibrants of FIG. 14A.

FIG. 14A is a XRM image 1440 with indicated calibrant phases air 1441, PP 1442, PLA 1443, PET 1444, and PTFE 1445. FIG. 14B shows the calibrant histograms in the plot 1450 for the calibrants of FIG. 14A. Specifically, the plot 1450 shows normalized frequency 1451 versus intensity 1452 histograms for air 1453, PP 1454, PLA 1455, PET 1456, and PTFE 1457.

The same rank ordering of calibrant intensities is observed in the plot 1450 for the synchrotron images as compared to the lab source (shown by the plot 1000 of FIG. 10A) indicating similar behavior in the images. Additionally, the calibrant histogram widths are comparable indicating that a sufficient number of pixels were sampled to obtain these histograms.

Figures 15A, 15B:
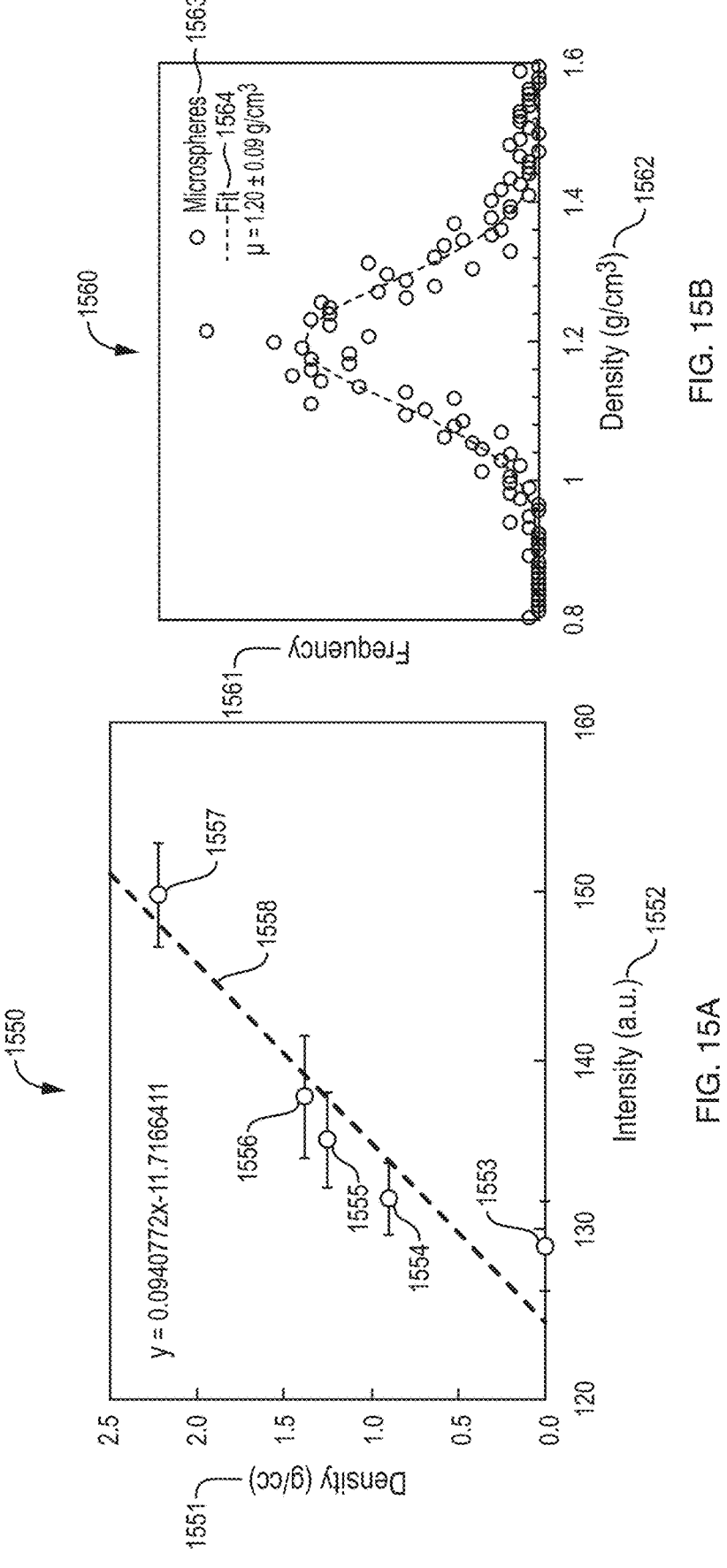
FIG. 15A is a plot showing results of converting histogram intensities into density with a linear regression.
FIG. 15B is a plot showing distribution of microsphere densities (circles) along with a Gaussian fit (dotted line).

FIG. 15A shows the conversion from intensity to density for the different calibrants used. Specifically, the plot 1550 of FIG. 15A shows density 1551 versus intensity 1552 for air 1553, PP 1554, PLA 1555, PET 1556, and PTFE 1557. The plot 1550 was generated using the mean and standard deviations of the calibrant histograms 1453-1457 shown in FIG. 14B along with the known calibrant densities. Further, from plot 1550 the linear relationship 1558 between intensity 1552 and density 1551 as implied by Beer's Law was determined.

Similar to the lab-based measurement, the conversion from intensity 1552 to density 1551 shows a strong linear fit 1558 ($R^2$=0.88). To continue, the individual microspheres were then subjected to the Gaussian deconvolution to obtain the density distribution histogram on a per sphere basis. The population of spheres, each with a density measurement, is then subjected to standard histogram analysis, which is shown in FIG. 15B as a per-sphere density histogram. The density histogram is shown in the plot 1560 of frequency 1561 versus density 1562 where the circles 1563 represent data for microspheres and the line 1564 is a fit to a Gaussian distribution. The microspheres show a mean density value of 1.20±0.09 g/cm$^3$ representing a 0.8% difference from the literature value, thus validating an accurate measurement of the density of the PMMA microspheres using the synchrotron source.

Findings

The synchrotron-based experiment was conducted both as a repeat measurement of the lab-based technique and also addressed several additional aspects of the density measurement embodiments described herein, namely:

A. Determine the impact of different X-ray sources and resolutions on the accuracy of the density measurement.

B. Assess the impact of enhanced diffraction artifacts from different reconstruction techniques.

C. Understand the impact of 8-bit images vs. 16-bit images in analysis.

The synchrotron X-ray source is different from lab instruments in 3 primary areas: the X-ray beam geometry (parallel beam at the synchrotron compared to cone beam in the lab), X-ray beam intensity (significantly greater photon flux at the synchrotron), and monochromatic X-ray energy (synchrotron) vs. polychromatic (X-ray energy). Different atomic species will attenuate X-rays differently given the X-ray photon energy which can thus affect the photon intensity at the detector. In the first case study discussed hereinabove, the lab X-ray source produced polychromatic X-rays via bremsstrahlung radiation which could potentially skew the density measurement. This was shown to have little effect on the final measurement, potentially due to the similarity in the elements making up the calibrants and the microspheres (mostly carbon, oxygen, hydrogen and fluorine). The X-rays at the synchrotron source are at $17\pm2$ keV energy, thus ensuring that no potential impacts from lower or higher energy photons will produce different attenuations. From both the calibrant histograms as well as the final density measurements of the PMMA spheres at both facilities, the X-ray energy distribution was shown to have little impact on the density measurement.

Figures 16A, 16B:
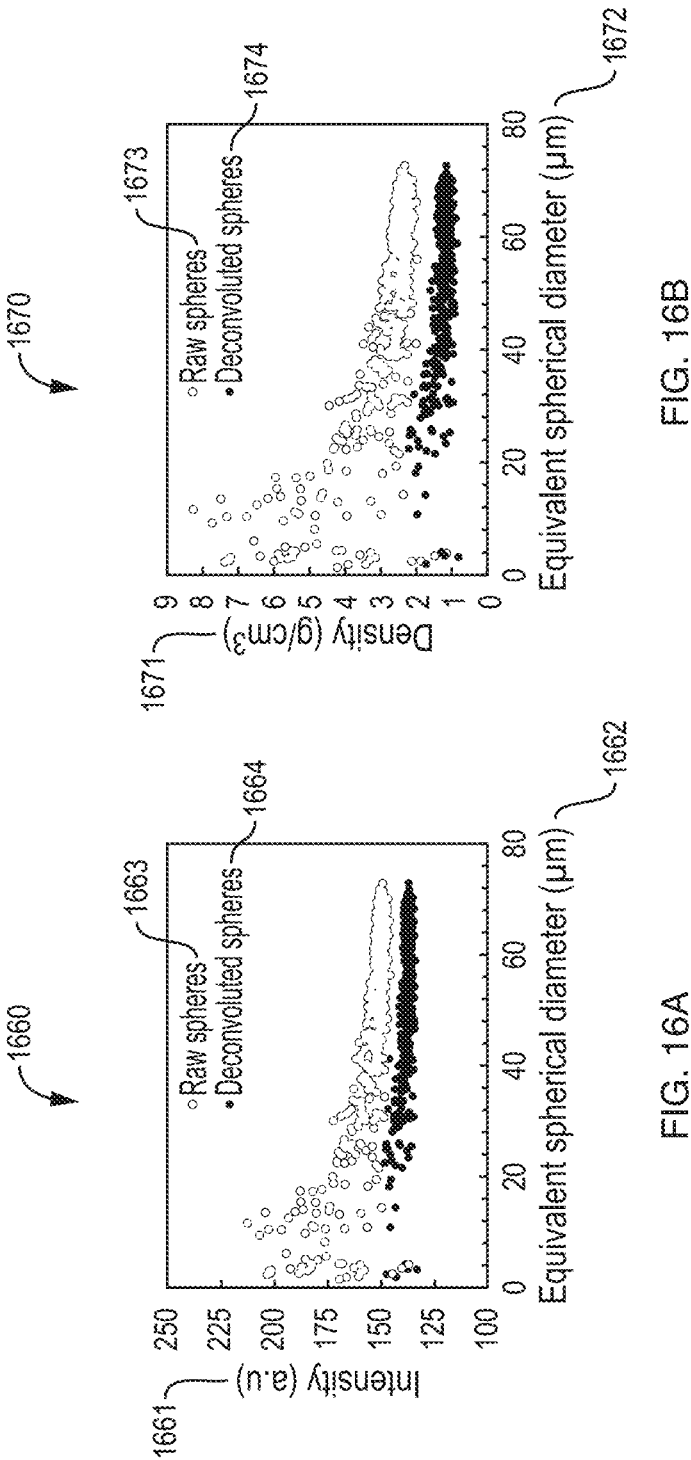
FIG. 16A is a plot of intensity as a function of equivalent spherical diameter for raw microspheres (light-shaded circles) and deconvoluted spheres (dark-shaded circles).
FIG. 16B is a plot of density versus sphere diameter determined by converting intensity from the plot of FIG. 16A into density for the microspheres.

The synchrotron reconstruction images were obtained using a phase-retrieval algorithm that enhances diffraction at the interface of phases in an image, thus increasing the diffraction artifact at the edge of the microspheres compared to the lab source (reconstructed using filtered back projection). This offers an opportunity to assess how different reconstruction algorithms impact the final measurement. FIGS. 16A-B show the microspheres before and after deconvolution. The plot 1660 of FIG. 16A shows the intensities 1661 versus equivalent spherical diameters 1662 of the raw microsphere phase (lighter shaded series 1663) and the deconvoluted spheres (darker shaded series 1664). The plot 1670 of FIG. 16B shows the densities 1671 versus equivalent spherical diameters 1672 of the raw microsphere phase (lighter shaded series 1673) and the deconvoluted spheres (darker shaded series 1674). In the plot 1660 the differences in intensity 1661 are visible. Converting these intensities 1661 into density 1671 (FIG. 16B) shows that without deconvolution the microsphere density 1671 is almost double the final value indicating again the necessity of this pre-processing step for accurate measurements. Furthermore, the converting also demonstrates the robustness of the measurement to variations in reconstruction algorithms that can have impacts on the image intensity. Similarly, FIGS. 16A-B also address the question of 8-bit vs. 16-bit images, in that the synchrotron images are 8-bit resulting in a smaller range of intensity values compared to the lab source. This did not produce any significant differences in the accuracy of the final measurement indicating that the approach described herein is robust under different image types as well.

Computer Support

Figure 17:
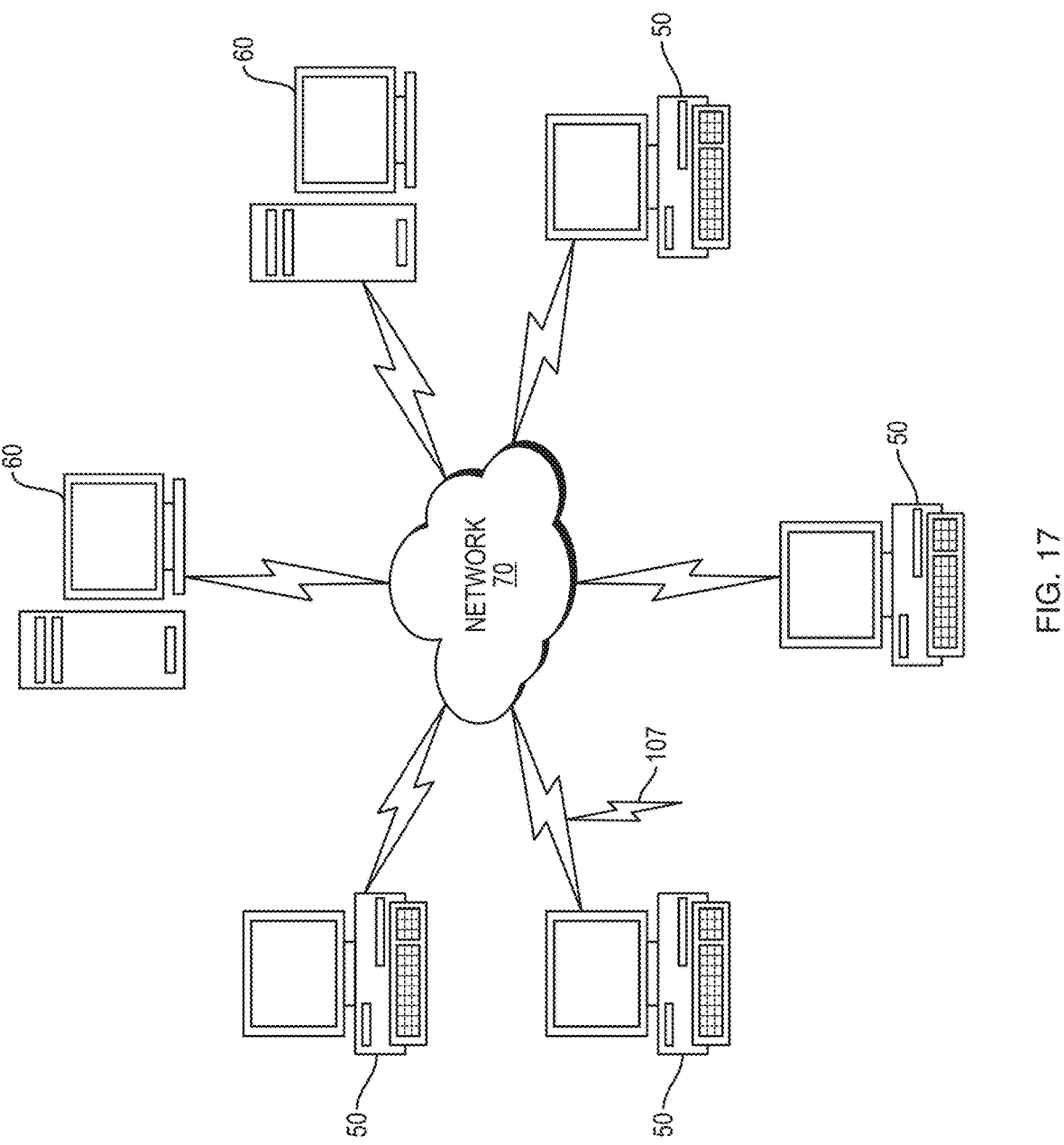
FIG. 17 illustrates a computer network, or similar digital processing environment, in which embodiments of the present invention may be implemented.

FIG. 17 illustrates a computer network or similar digital processing environment in which embodiments of the present invention may be implemented. Client computer(s)/device(s) 50 and server computer(s) 60 provide processing, storage, and input/output devices executing application programs and the like. The client computer(s)/device(s) 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 18:
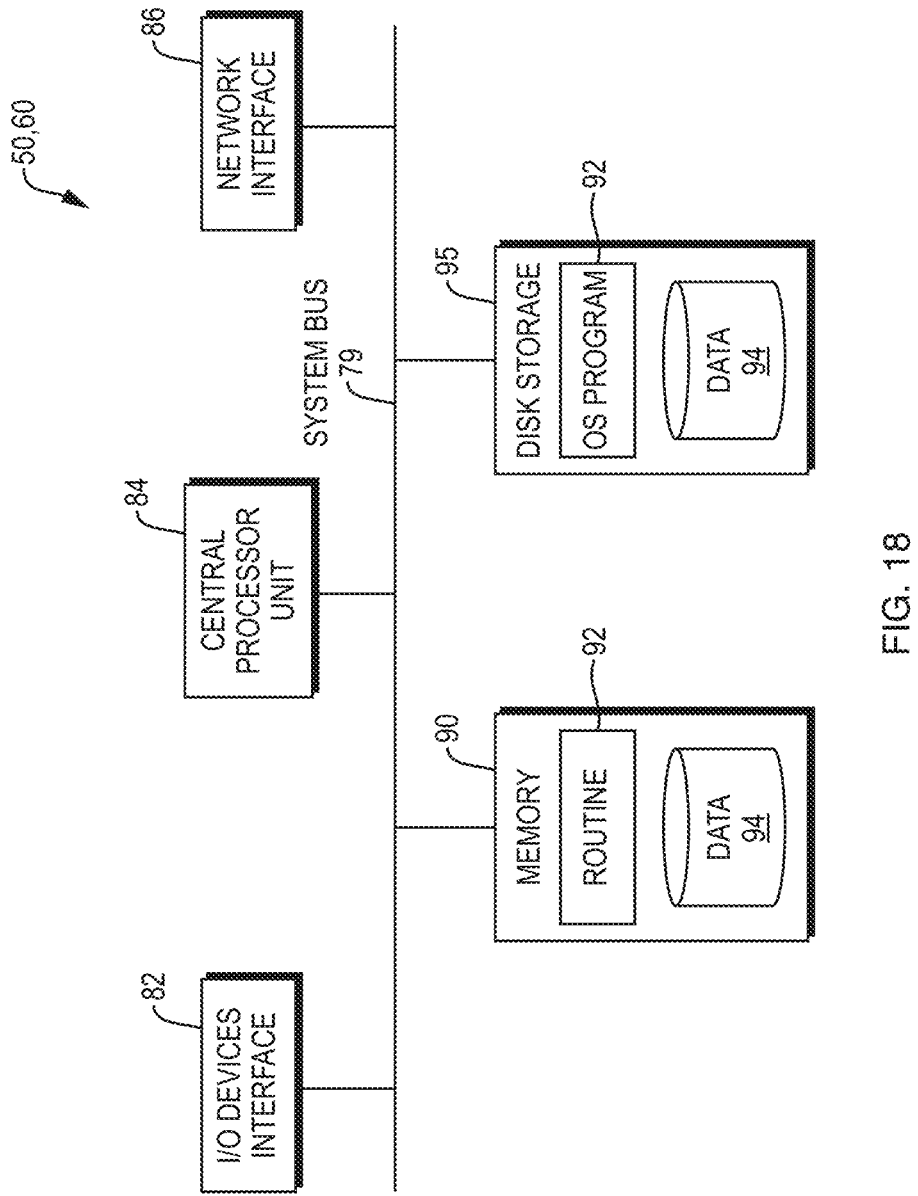
FIG. 18 is a diagram of an example internal structure of a computer (e.g., client processor/device or server computers) in the computer system of FIG. 17.

FIG. 18 is a diagram of an example internal structure of a computer (e.g., client processor/device 50 or server computers 60) in the computer system of FIG. 17. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) and enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to other various devices attached to a network (e.g., network 70 of FIG. 17). Memory 90 provides volatile storage for computer software instructions 92 and data 94 used to implement embodiments of the present invention (e.g., functionality of FIGS. 1 5, and 8, amongst others detailed herein). Disk storage 95 provides non-volatile storage for the computer software instructions 92 and the data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory, computer-readable medium (e.g., a removable storage medium such as one or more internal hard drives, external hard drives, DVD-ROMs, CD-ROMs, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other networks. In one embodiment, the propagated signal is a signal that is transmitted over the propagation medium over a period of time, such as the instructions for a software application sent in packets over a network over a period of milliseconds, seconds, minutes, or longer.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Bevington, Philip R., and D. Keith Robinson. "Data Reduction and Error Analysis." *McGraw€" Hill, New York*, 2003.

[2] Boone, John M., and Thomas R. Yellen-Nelson. *Measuring Breast Density Using Breast Computed Tomography*. Google Patents, 4 Feb. 2020.

[3] Chen-Mayer, Huaiyu Heather, et al. "Standardizing CT Lung Density Measure across Scanner Manufacturers." *Medical Physics*, vol. 44, no. 3, Wiley Online Library, 2017, pp. 974-85.

[4] Fredenberg, Susanne, et al. "The Mechanisms of Drug Release in Poly(Lactic-Co-Glycolic Acid)-Based Drug Delivery Systems—A Review." *International Journal of Pharmaceutics*, vol. 415, no. 1-2, Elsevier B. V., 2011, pp. 34-52, doi:10.1016/j.ijpharm.2011.05.049.

[5] Huda, Walter, and Richard M. Slone. *Review of Radiologic Physics*. Lippincott Williams & Wilkins, 2003.

[6] Kalasová, Dominika, et al. "Characterization of a Laboratory-Based X-Ray Computed Nanotomography System for Propagation-Based Method of Phase Contrast Imaging." *IEEE Transactions on Instrumentation and Measurement*, vol. 69, no. 4, IEEE, 2019, pp. 1170-78.

[7] Kawai, Heiji. "The Piezoelectricity of Poly (Vinylidene Fluoride)." *Japanese Journal of Applied Physics*, vol. 8, no. 7, IOP Publishing, 1969, p. 975.

[8] Lang, Philipp, et al. *Method for Bone Structure Prognosis and Simulated Bone Remodeling*. Google Patents, 16 Oct. 2012.

[9] Lovinger, Andrew J. "Ferroelectric Polymers." *Science*, vol. 220, no. 4602, American Association for the Advancement of Science, 1983, pp. 1115-21.

[10] Oster, Gerald, and Masahide Yamamoto. "Density Gradient Techniques." *Chemical Reviews*, vol. 63, no. 3, ACS Publications, 1963, pp. 257-68.

[11] Richards, Sarah, and Abdelmalek Bouazza. "Determination of Particle Density Using Water and Gas Pycnometry." *Geotechnique*, vol. 57, no. 4, Thomas Telford Ltd, 2007, pp. 403-06.

[12] Steiner, G., and C. Zimmerer. "Polyvinylidene Fluoride (PVDF)." *Polymer Solids and Polymer Melts—Definitions and Physical Properties I*, Springer, 2013, pp. 506-12.

[13] Swinehart, Donald F. "The Beer-Lambert Law." *Journal of Chemical Education*, vol. 39, no. 7, ACS Publications, 1962, p. 333.

[14] Yost, Edward, et al. "Quantitative X-Ray Microcomputed Tomography Assessment of Internal Tablet Defects." *Journal of Pharmaceutical Sciences*, vol. 108, no. 5, Elsevier, 2019, pp. 1818-30.

[15] Zhang, Shawn, et al. "Characterization of Controlled Release Microspheres Using FIB-SEM and Image-Based Release Prediction." *AAPS PharmSciTech*, vol. 21, no. 5, AAPS PharmSciTech, 2020, doi:10.1208/s12249-020-01741-w.

[16] Zhang, Shuang. *System and Method for Computing Drug Controlled Release Performance Using Images*. Google Patents, 3 Aug. 2021.

[17] Zhong, Hao, et al. "A Comprehensive Map of FDA-Approved Pharmaceutical Products." *Pharmaceutics*, vol. 10, no. 4, Multidisciplinary Digital Publishing Institute, 2018, p. 263.

What is claimed is:

1. A method for determining density of a material, the method comprising:

segmenting imaging data of a material and a calibrant into a plurality of phases;

for each of the plurality of phases, determining a respective histogram based on pixel intensity of obtained imaging data corresponding to the phase;

deconvoluting a given histogram corresponding to a phase of the material into (i) a function corresponding to artifacts and (ii) a function corresponding to the material;

determining a relationship between density and pixel intensity using one or more histogram corresponding to the calibrant; and applying the determined relationship to the function corresponding to the material to determine density of the material.

2. The method of claim 1 further comprising:

obtaining the imaging data of the material and the calibrant by subjecting the material and the calibrant, in a sample holder, to a computed tomography imaging.

3. The method of claim 1 wherein segmenting the imaging data comprises at least one of:

segmenting the imaging data based on intensity;

segmenting the imaging data based upon gradients; and segmenting the imaging data by processing the imaging data with at least one of: a machine learning algorithm and an artificial intelligence algorithm to identify data corresponding to each phase of the plurality of phases.

4. The method of claim 1 wherein deconvoluting the given histogram corresponding to a phase of the material comprises:

performing an analysis to deconvolute data of the given histogram to (i) the function corresponding to artifacts and (ii) the function corresponding to the material.

5. The method of claim 1 wherein the calibrant comprises a plurality of calibrant-materials each with a respective known density.

6. The method of claim 5 wherein determining the relationship between density and pixel intensity using one or more histogram corresponding to the calibrant comprises:

determining average pixel intensity for each of the plurality of calibrant-materials using respective histograms corresponding to each of the plurality of calibrant-materials; and determining the relationship using the average pixel intensity determined for each of the plurality of calibrant-materials and respective known densities of each of the plurality of calibrant-materials.

7. The method of claim 6 wherein determining average pixel intensity for each of the plurality of calibrant-materials using respective histograms corresponding to each of the plurality of calibrant-materials comprises:

deconvoluting each histogram corresponding to each of the plurality of calibrant-materials into (i) an artifact function and (ii) a calibrant-material function; and determining the average pixel intensity of each of the plurality of calibrant-materials using corresponding calibrant-material functions.

8. The method of claim 6 wherein the determined relationship is a mathematical function between the average pixel intensity determined for each of the plurality of calibrant-materials and the respective known densities of each of the plurality of calibrant-materials.

9. The method of claim 1 further comprising at least one of:

determining average density of the material;

determining uncertainty in the determined density;

responsive to the material being composed of discrete particles, determining a density distribution of the particles over a range of particle sizes, a density of each particle, and a standard deviation of each particle; and responsive to the material being composed of continuous material phase, determining a density distribution along arbitrary orientations in at least one of: a Cartesian coordinate system, a cylindrical coordinate system, and a spherical coordinate system.

10. The method of claim 1 further comprising:

deconvoluting the given histogram into (i) multiple functions corresponding to multiple different artifacts and (ii) multiple functions corresponding to multiple materials.

11. The method of claim 1 further comprising:

identifying the determined density is unphysical; and responsive to identifying the determined density is unphysical, determining corrected density or determining corrected density cannot be identified.

12. The method of claim 11 wherein determining corrected density comprises at least one of:

generating corrected imaging data and repeating the segmenting, determining a respective histogram, deconvoluting, determining a relationship, and applying using the corrected imaging data;

obtaining new imaging data of the material and a new calibrant and repeating the segmenting, determining a respective histogram, deconvoluting, determining a relationship, and applying using the new imaging data; and obtaining higher resolution imaging data that corrects for at least one of geometry, shape, and morphology caused heterogeneity, and repeating the segmenting, determining a respective histogram, deconvoluting, determining a relationship, and applying using the higher resolution imaging data.

* * * * *